(12) United States Patent
Sano et al.

(10) Patent No.: US 8,297,965 B2
(45) Date of Patent: *Oct. 30, 2012

(54) TOUCH ROLL, MAIN ROLL, SHEET FILM CASTING APPARATUS, FINE PATTERN TRANSFERRING APPARATUS AND SHEET FILM

(75) Inventors: Takayoshi Sano, Fuji (JP); Takashi Hirose, Numazu (JP); Tomonori Fuchigami, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 532 days.

This patent is subject to a terminal disclaimer.

(21) Appl. No.: 12/473,607

(22) Filed: May 28, 2009

(65) Prior Publication Data
US 2009/0297777 A1    Dec. 3, 2009

(30) Foreign Application Priority Data
May 28, 2008   (JP) .................................. 2008-139686

(51) Int. Cl.
*B29C 59/04* (2006.01)
(52) U.S. Cl. ............. 425/363; 165/89; 425/471; 492/46
(58) Field of Classification Search .................. 425/224, 425/363, 445, 446, 471; 492/16, 46; 165/89
See application file for complete search history.

(56) References Cited

U.S. PATENT DOCUMENTS

| | | |
|---|---|---|
| 3,470,948 A | 10/1969 | Korsch |
| 3,490,119 A | 1/1970 | Fukuyama at al. |
| 3,747,181 A | 7/1973 | Nykopp et al. |
| 4,068,360 A | 1/1978 | Freuler et al. |
| 4,071,081 A | 1/1978 | Chielens et al. |
| 4,233,011 A | 11/1980 | Bolender et al. |
| 4,440,214 A | 4/1984 | Wedel |

(Continued)

FOREIGN PATENT DOCUMENTS

CN    1834567 A    9/2006

(Continued)

OTHER PUBLICATIONS

Notice of Allowance issued in counterpart Taiwan Application No. 096147234 on Jan. 27, 2010.

(Continued)

*Primary Examiner* — James Mackey
(74) *Attorney, Agent, or Firm* — DLA Piper LLP (US)

(57) ABSTRACT

Disclosed is a touch roll (211) including: a center rotary shaft (20); fixed end plates (28, 29) concentrically disposed in two places which are away from each other in an axial direction of the center rotary shaft; an external cylinder (40) made of a metal-made thin film and rotatably supported, at two ends thereof, by the respective fixed end plates, the external cylinder being concentric with the center rotary shaft; and multiple rolling rubber rolls (70) each rotatably supported, at two ends thereof, by the respective fixed end plates, the plurality of rolling rubber rolls being in sliding contact with an outer peripheral surface of the center rotary shaft, and being in sliding contact with an inner peripheral surface of the external cylinder. In the touch roll, the rolling rubber rolls divide an annular space between the external cylinder and the center rotary shaft into multiple heating medium chambers arranged in a circumferential direction of the touch roll; and the rolling rubber rolls are configured in a way that each of the multiple heating medium chambers is filled with a heating medium.

10 Claims, 14 Drawing Sheets

U.S. PATENT DOCUMENTS

| | | | |
|---|---|---|---|
| 4,823,450 | A | 4/1989 | Ramisch et al. |
| 5,060,357 | A | 10/1991 | Roerig et al. |
| 5,188,273 | A | 2/1993 | Schmoock |
| 5,567,448 | A | 10/1996 | Frankland |
| 5,943,895 | A | 8/1999 | Lemper |
| 5,945,042 | A * | 8/1999 | Mimura et al. ............... 425/385 |
| 5,984,568 | A | 11/1999 | Lohbeck |
| 5,984,658 | A * | 11/1999 | Shimizu ........................ 425/363 |
| 6,129,017 | A | 10/2000 | Mohrmann et al. |
| 6,221,301 | B1 * | 4/2001 | Tsunashima et al. ......... 425/224 |
| 6,568,931 | B2 * | 5/2003 | Fujii et al. .................... 425/363 |
| 7,367,794 | B2 * | 5/2008 | Sano ............................. 425/471 |
| 7,811,218 | B2 * | 10/2010 | Sano et al. ...................... 492/46 |
| 7,825,320 | B2 | 11/2010 | Kerschbaumer |
| 7,846,367 | B2 | 12/2010 | Sano |
| 7,850,587 | B2 | 12/2010 | Sano |
| 7,963,037 | B2 | 6/2011 | Garben |
| 2004/0113316 | A1 | 6/2004 | Fujii et al. |
| 2006/0211556 | A1 | 9/2006 | Sano |
| 2007/0052118 | A1 | 3/2007 | Kudo et al. |
| 2007/0063376 | A1 | 3/2007 | Sano et al. |
| 2009/0297777 | A1 | 12/2009 | Sano et al. |
| 2010/0119639 | A1 | 5/2010 | Sano et al. |

FOREIGN PATENT DOCUMENTS

| | | |
|---|---|---|
| CN | 1928648 | 3/2007 |
| DE | 1251188 | 9/1967 |
| DE | 1575524 | 1/1970 |
| DE | 69731321 | 10/2005 |
| DE | 102006012398 | 9/2006 |
| DE | 102006044463 | 5/2007 |
| JP | H 03-227858 | 10/1991 |
| JP | 4-164741 | 6/1992 |
| JP | H 10-217314 | 8/1998 |
| JP | 10-315304 | 12/1998 |
| JP | 11-207817 | 8/1999 |
| JP | 11-235747 | 8/1999 |
| JP | H 11-314263 | 11/1999 |
| JP | 2000-506795 | 6/2000 |
| JP | 2000-239409 | 9/2000 |
| JP | 3194904 B2 | 8/2001 |
| JP | 2002-036332 | 2/2002 |
| JP | 3422798 | 6/2003 |
| JP | 2005-138509 | 6/2005 |
| JP | 2006-256159 | 9/2006 |
| JP | 2007-083577 | 4/2007 |
| KR | 10-0671216 | 1/2007 |
| KR | 2007-26264 | 3/2007 |
| TW | 019205 | 9/1975 |
| TW | 189464 | 8/1992 |
| TW | 194705 | 11/1992 |
| TW | 324686 | 1/1998 |
| TW | 496797 | 8/2002 |
| TW | 2007 14452 | 4/2007 |
| TW | 2007 16356 | 5/2007 |
| WO | WO 97/34754 A1 | 9/2007 |

OTHER PUBLICATIONS

Search Report issued in counterpart Taiwan Application No. 096147234 on Jan. 26, 2010.
English abstract of CN1834567A issued on Sep. 20, 2006.
Machine English language translation of JP 3194904B2 issued on Aug. 6, 2001.
English abstract of TW324686 issued on Jan. 11, 1998.
English abstract of JP-2007-083577, Apr. 5, 2007.
Machine English language translation of JP-2007-083577, Apr. 5, 2007.
English abstract of JP-H08-230018 published Sep. 10, 1996.
Machine English language translation of JP-H08-230018 published Sep. 10, 1996.
English abstract of JP-2006-256159 published Sep. 26, 2006.
Machine English language translation of JP-2006-256159 published Sep. 26, 2006.
English abstract of JP-11-235747 published Aug. 31, 1999.
Machine English language translation of JP-11-235747 published Aug. 31, 1999.
Chinese Office Action issued in CN 2008-10109176.5 on Nov. 15, 2011.
English Language Translation of Chinese Office Action issued in CN2008-10109176.5 on Nov. 15, 2011.
German Office Action issued in Application No. 102006044463.9-16 mailed Jan. 24, 2008.
English translation of German Office Action issued in Application No. 102006044463.9-16 mailed Jan. 24, 2008.
English translation of DE 1 251 188, published Sep. 28, 1967.
Taiwan IPO Search Report issued in Application No. 095134908 mailed Jul. 30, 2008.
English language abstract of Taiwan IPO Search Report issued in Application No, 095134908 mailed Jul. 30, 2008.
English language translation of TW189464 published Aug. 21, 1992.
English language abstract of TW019205 published Sep. 1, 1975.
Machine English language translation of JP 11-207817 published Aug. 3, 1999.
English language abstract of JP 04-164741 published Jun. 10, 1992.
English language abstract of JP 11-207817 published Aug. 3, 1999.
Office Action issued in Japanese Application No. 2005-275602, dated Feb. 10, 2009.
English language translation of Office Action issued in Japanese Application No. 2005-275602, dated Feb. 10, 2009.
English language abstract of International Application No. WO 97/28950, which was also ublished as JP 3422798.
Korean Office Action mailed Sep. 18, 2007; Application No. 10-2006-133621.
English translation of Korean Abstract published under Korean Publication No. 10-0671216.
German Office Action issued in Application No. 10 2006 061040.7-16 mailed Mar. 19, 2008.
English Translation of German Office Action issued in Application No. 10 2006 061040.7-16 mailed Mar. 19, 2008.
Chinese Office Action issued in Application No. 200610156230.2 dated Oct. 31, 2008.
English language translation of Office Action issued Chinese Application No. 200610156230.2 dated Oct. 31, 2008.
English Language Machine Translation of JP 2002-036332 published Feb. 5, 2002.
English Language Abstract of JP 2002-036332 published Feb. 5, 2002.
English Language Machine Translation of JP 3422798 published Jun. 30, 2003.
English Language Machine Translation of JP 2000-506795 published Jun. 6, 2000.
Notice of Allowance in Taiwan application No. 09514926, issued on Jun. 25, 2009.
English Language Abstract of JP 2005-138509 published Jun. 2, 2005.
English Language Machine Translation of JP 2005-138509 published Jun. 2, 2005.
Search Report in Taiwan application No. 095149026, issued on Jun. 25, 2009.
English translation of search report in Taiwan application No. 09514926, issued on Jun. 25, 2009.
English Language Abstract of JP 3422798 published on Jun. 30, 2003.
English Language Translation of TW 496797 published Aug. 1, 2002.
English Language Abstract of JP 2000-506795 published Jun. 6, 2000.
English Language Abstract of DE 69731321 published Oct. 20, 2005.
English Language Machine Translation of JP 10-315304.
Korean Office Action mailed Oct. 21, 2009 in Application No. 10-2008-47783.
English Language Abstract of KR 2007-26264 published Mar. 8, 2007.
Partial English Language translation for Korean Office Action mailed Oct. 21, 2009 in Applicatiion No. 10-2008-47783.
Office Action issued in JP 2005-376468 on Apr. 13, 2010.
English Language Translation of Office Action issued in JP 2005-376468 on Apr. 13, 2010.
Office Action issued in JP 2005-376029 on Apr. 13, 2010.

English Language Translation of Office Action issued in JP 2005-376029 on Apr. 13, 2010.
English Language Abstract JP 2000-239409 published Sep. 5, 2000.
English machine language translation of JP 2000-239409 published Sep. 5, 2000.
English Language Abstract of JP H 10-217314 published Aug. 18, 1998.
English machine language translation of JP H 10-217314 published Aug. 18, 1998.
English Language Abstract of JP H 11-314263 published Nov. 16, 1999.
English machine language translation of JP H 11-314263 published Nov. 16, 1999.
USPTO Related U.S. Appl. No. 11/614,223 electronically captured on Dec. 27, 2011.
USPTO Related U.S. Appl. No. 12/473,579 electronically captured on Dec. 27, 2011.
USPTO Related U.S. Appl. No. 12/518,511 electronically captured on Dec. 27, 2011.
USPTO Related U.S. Appl. No. 11/534,339 electronically captured on Dec. 27, 2011.
USPTO Related U.S. Appl. No. 12/877,720 electronically captured on Dec. 27, 2011.
English Language Abstract of JP 3-227858 published Oct. 8, 1991.
International Searh Report issued in PCT/JP2007/073797 published Feb. 5, 2008.
English abstract of JP-10-315304 published Dec. 2, 1998.
Office Action issued in Chinese Appl 200810109176.5 on Mar. 8, 2010.
English Language Translation of Office Action issued in Chinese Appl 200810109176.5 on Mar. 8, 2010.
Decision of Refusal issued in Chinese Appln. 200810109176.5 on Nov. 9, 2010.
English Translation of Decision of Refusal issued in Chinese Appln. 200810109176.5 on Nov. 9, 2010.
English Language Abstract of CN 1928648 published Mar. 14, 2007.
Office Action issued in TW97119277 on Dec. 3, 2010.
English Language Translation of Office Action issued in TW97119277 on Dec. 3, 2010.
English Language Abstract of TW200716356 published May 1, 2006.
English Language Abstract of TW200714452 published on Apr. 16, 2007.
Chinese Office Action issued in CN 200810109176.5 on May 25, 2011.
English Language Translation of Chinese Office Action issued in CN 200810109176.5 on May 25, 2011.
Korean Office Action issued in KR10-2009-46404 issued on Nov. 19, 2010.
Partial English Translation of Korean Office Action issued in KR10-2009-46404 issued on Nov. 19, 2010.
U.S. Appl. No. 12/126,202 electronically captured on Dec. 27, 2011.
USPTO Related U.S. Appl. No. 12/518,511 electronically captured on Jun. 12, 2012 between Apr. 4, 2012 through Jun. 12, 2012.
USPTO Related U.S. Appl. No. 12/877,720 electronically captured on Jun. 12, 2012 between Apr. 23, 2012 through Jun. 12, 2012.

* cited by examiner

TOUCH ROLL, MAIN ROLL, SHEET FILM CASTING APPARATUS, FINE PATTERN TRANSFERRING APPARATUS AND SHEET FILM

BACKGROUND OF THE INVENTION

1. Field of the Invention

The present invention relates to a touch roll, a main roll, a sheet film casting apparatus, a fine pattern transferring apparatus and a sheet film. In particular, the present invention relates to a roll or the like which has multiple rubber rolls inside its external cylinder.

2. Descriptions of the Related Art

Heretofore-known sheet film forming apparatuses include an apparatus configured to form a sheet film by sandwiching a molten resin W poured out of a T-die 401 between a main roll 403 and a touch roll 405 (see FIG. 1).

The touch roll 405 of the sheet film forming apparatus includes: an internal cylinder member 407; a rubber roll; eccentric side plates; and a cylindrical metal-made elastic external cylinder 409 having a thin structure. The internal cylinder member 407 has shaft portions in its two ends and is rotatably supported by these shaft portions with bearing parts, respectively. The rubber roll is attached to an outer peripheral surface of the internal cylinder member 407. The eccentric side plates are rotatably attached to the shaft portions in the two ends of the internal cylinder member. The cylindrical metal-made elastic external cylinder 409 is rotatably supported by the eccentric side plates, has the inner diameter larger than the outer diameter of the rubber roll, accommodates the rubber roll in its inside, and has a part of the inner peripheral surface in contact with a part of the outer peripheral surface of the rubber roll. The configuration of the touch roll is disclosed in Japanese Patent Application Laid-Open No. 2007-83577.

The conventional type of sheet film forming apparatus has the following problem. Because the rigidity of the touch roll 405 is insufficient, the touch roll 405 is elastically deformed when the resin W is sandwiched between the main roll 403 and the touch roll 405. This makes it highly likely that the touch roll 405 may be incapable of pressing the sheet film with an even pressing force in the width direction of the sheet film.

This problem becomes conspicuous particularly in a case where the main roll and the touch roll are made longer in length for the purpose of forming a resin into a wider sheet film, and in a case where the main roll and the touch roll are heavier in mass.

SUMMARY OF THE INVENTION

The present invention has been made with the problem taken into consideration. Accordingly, an object of the present invention is to reduce as much as possible the deformation of a touch roll and a main roll between which a resin is sandwiched, and accordingly to provide the touch roll and the main roll capable of pressing a resin against each other with an even pressing force in the width direction of the resin.

For the purpose of attaining the object, a first aspect of the present invention is a touch roll including: a center rotary shaft rotatably supported by bearing members; fixed end plates concentrically disposed respectively in two places which are away from each other in an axial direction of the center rotary shaft; an external cylinder made of a metal thin film, and rotatably supported, at two ends thereof, by the respective fixed end plates, the external cylinder being concentric with the center rotary shaft; and multiple rolling rubber rolls each rotatably supported, at two ends thereof, by the respective fixed end plates, the rolling rubber rolls being in sliding contact with an outer peripheral surface of the center rotary shaft, and being in sliding contact with an inner peripheral surface of the external cylinder. In this configuration, the rolling rubber rolls divide an annular space between the external cylinder and the center rotary shaft into multiple heating medium chambers arranged in a circumferential direction of the touch roll. In addition, the rolling rubber rolls are configured in a way that each of the multiple heating medium chambers is filled with a heating medium.

A second aspect of the present invention which is dependent on the first aspect is the touch roll according to the first aspect, in which at least one of the rolling rubber rolls is different from the others of the rolling rubber rolls in terms of the amount of crowning.

A third aspect of the present invention which is dependent on any one of the first and second aspects is the touch roll according to any one of the first and second aspects, further including an index positioning unit capable of positioning the fixed end plates at index positions.

A fourth aspect of the present invention is a main roll including: a center rotary shaft rotatably supported by bearing members; fixed end plates concentrically disposed respectively in two places which are away from each other in an axial direction of the center rotary shaft; an external cylinder made of a metal thin film, and rotatably supported, at two ends thereof, by the respective fixed end plates, the external cylinder being concentric with the center rotary shaft; and multiple rolling rubber rolls each rotatably supported, at two ends thereof, by the respective fixed end plates, the rolling rubber rolls being in sliding contact with an outer peripheral surface of the center rotary shaft, and being in sliding contact with an inner peripheral surface of the external cylinder. In this configuration, the rolling rubber rolls divide an annular space between the external cylinder and the center rotary shaft into multiple heating medium chambers arranged in a circumferential direction of the main roll. In addition, the rolling rubber rolls are configured in a way that each of the multiple heating medium chambers is filled with a heating medium. Furthermore, at least one of the rolling rubber rolls is different from the others of the rolling rubber rolls in terms of the amount of crowning.

A fifth aspect of the present invention which is dependent on the fourth aspect is the main roll according to the fourth aspect, further including an index positioning unit capable of positioning the fixed end plates at index positions.

A sixth aspect of the present invention is a main roll including: a center rotary shaft rotatably supported by bearing members; fixed end plates concentrically disposed respectively in two places which are away from each other in an axial direction of the center rotary shaft; an external cylinder made of a metal thin film, and rotatably supported, at two ends thereof, by the respective fixed end plates, the external cylinder being concentric with the center rotary shaft; multiple rolling rubber rolls each rotatably supported, at two ends thereof, by the respective fixed end plates, the multiple rolling rubber rolls being in sliding contact with an outer peripheral surface of the center rotary shaft, and being in sliding contact with an inner peripheral surface of the external cylinder; and an index positioning unit capable of positioning the fixed end plates at index positions. In this configuration, the rolling rubber rolls divide an annular space between the external cylinder and the center rotary shaft into multiple heating medium chambers arranged in a circumferential direction of the main roll, and the rolling rubber rolls are configured in a way that each of the multiple heating medium chambers is filled with a heating medium.

A seventh aspect of the present invention is a touch-roll type of sheet film casting apparatus including at least one of the touch roll according to any one of the first to third aspects and the main roll according to any one of the fourth to sixth aspects.

An eighth aspect of the present invention is a fine pattern transferring apparatus including at least one of the touch roll according to any one of the first to third aspects and the main roll according to any one of the fourth to sixth aspects.

A ninth aspect of the present invention is a sheet film produced by use of the touch-roll type of sheet film casting apparatus according to the seventh aspect.

A tenth aspect of the present invention is a sheet film produced by use of the fine pattern transferring apparatus according to the eighth aspect.

The present invention brings about an effect that the deformations of the respective rolls, inclusive of the touch roll, configured to sandwich a resin are reduced to the minimum possible, and an effect that the resin is accordingly capable of receiving a pressing force which is even in a width direction of the resin.

BRIEF DESCRIPTIONS OF THE ACCOMPANYING DRAWINGS

DETAILED DESCRIPTIONS OF THE PREFERRED EMBODIMENTS

Descriptions will be hereinafter provided for the embodiments of the present invention on the basis of the drawings.

Referring to FIGS. 2 to 5, descriptions will be provided for an embodiment of a sheet film forming roll (for example, a main roll) according to the present invention.

Figure 1:
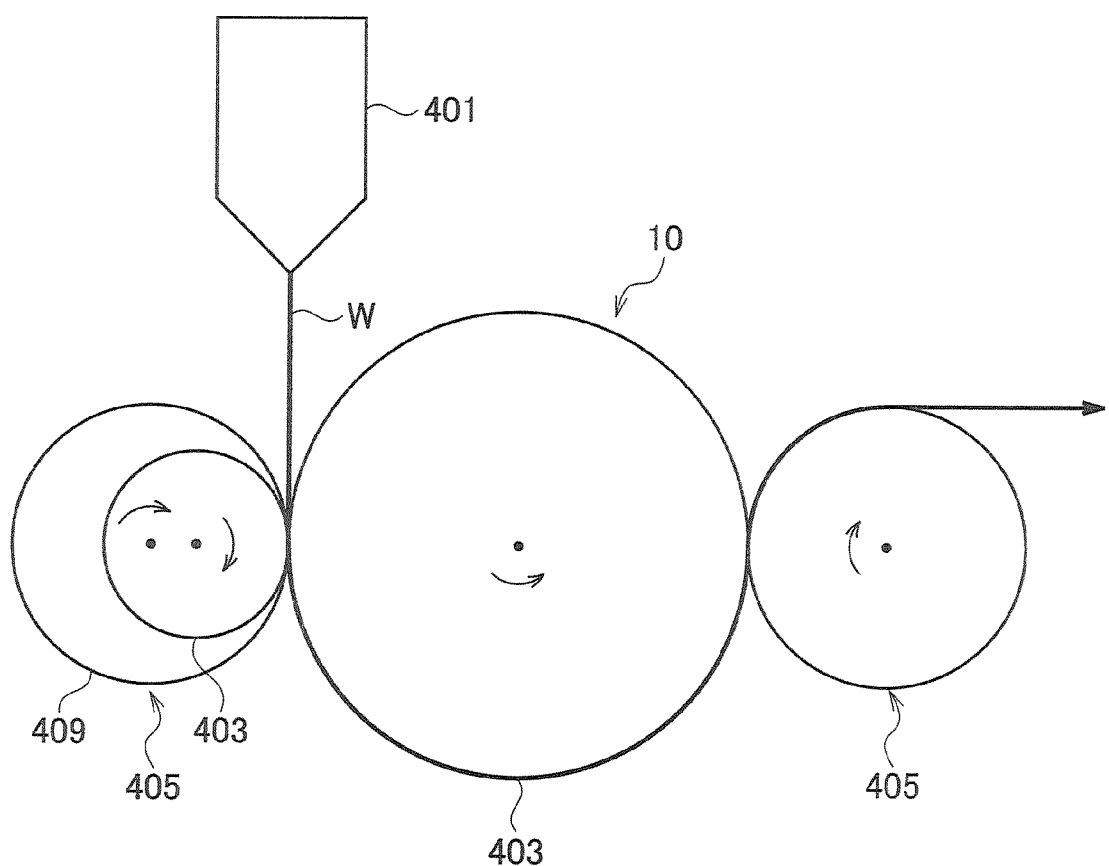
FIG. 1 is a diagram showing a schematic configuration of a conventional type of sheet film forming apparatus.
Figure 2:
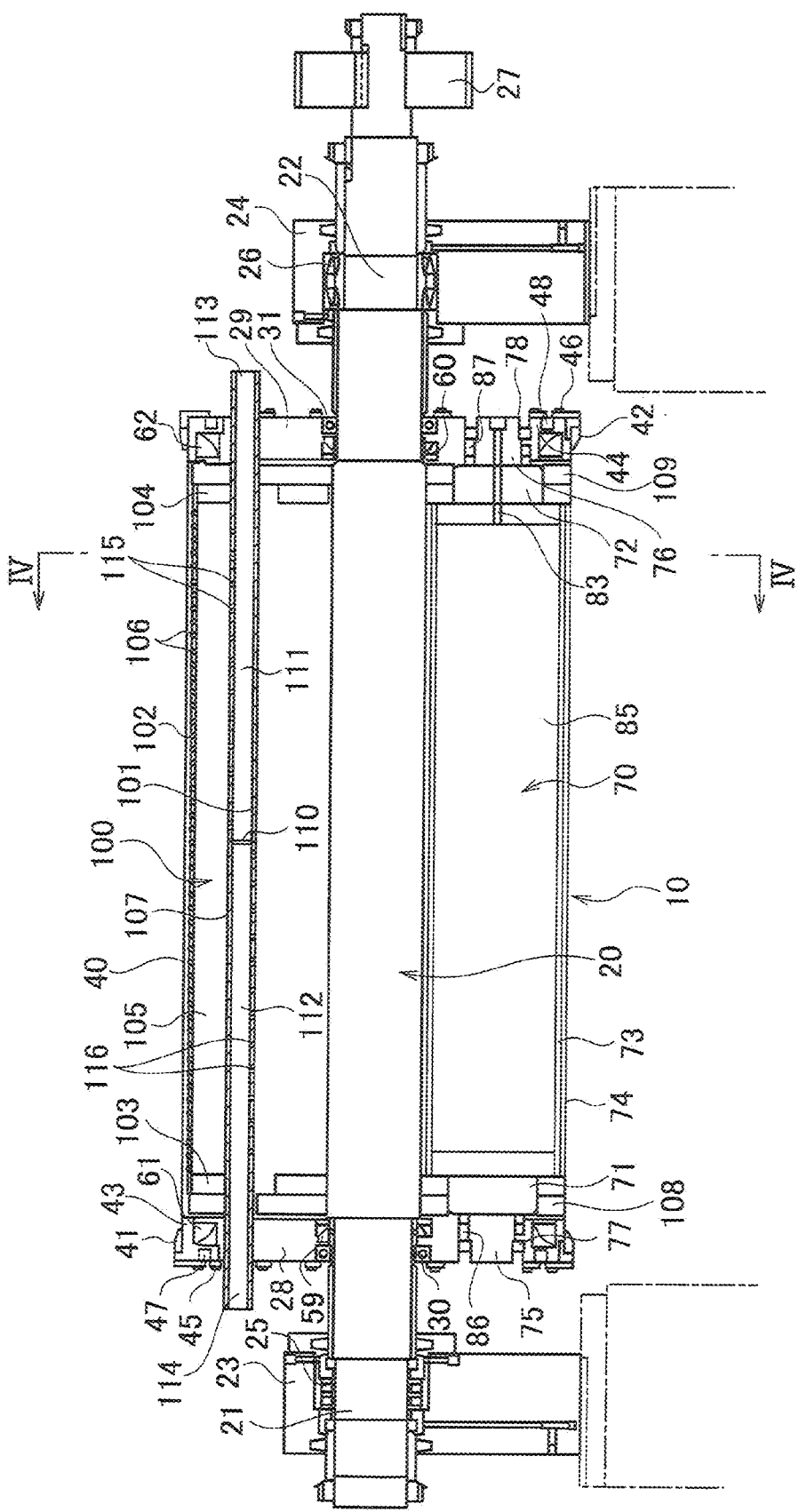
FIG. 2 is a longitudinal cross-sectional view showing an embodiment of a main roll according to the present invention.
Figure 3:
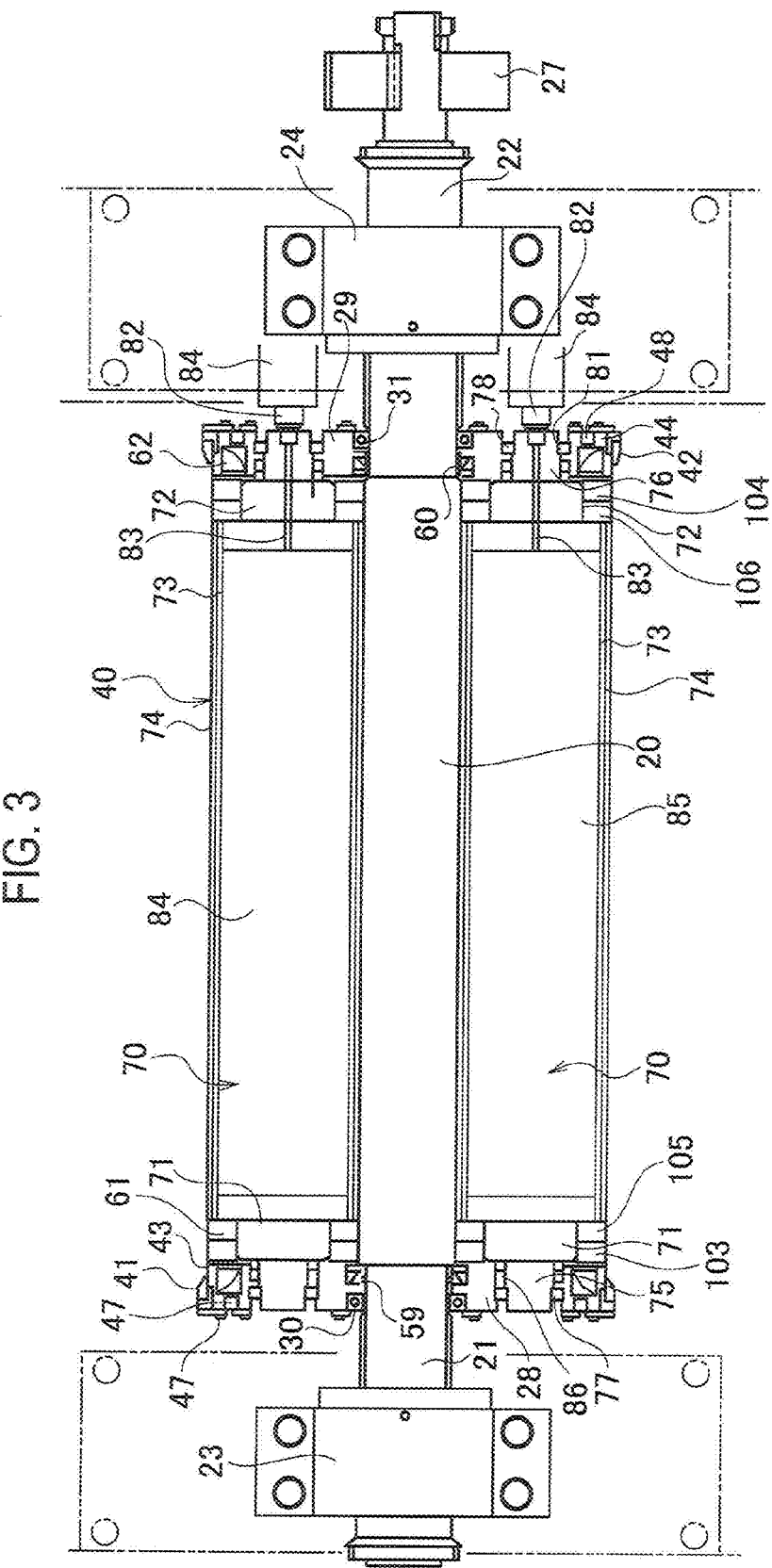
FIG. 3 is a plane cross-sectional view showing the embodiment of the main roll according to the present invention.
Figure 4:
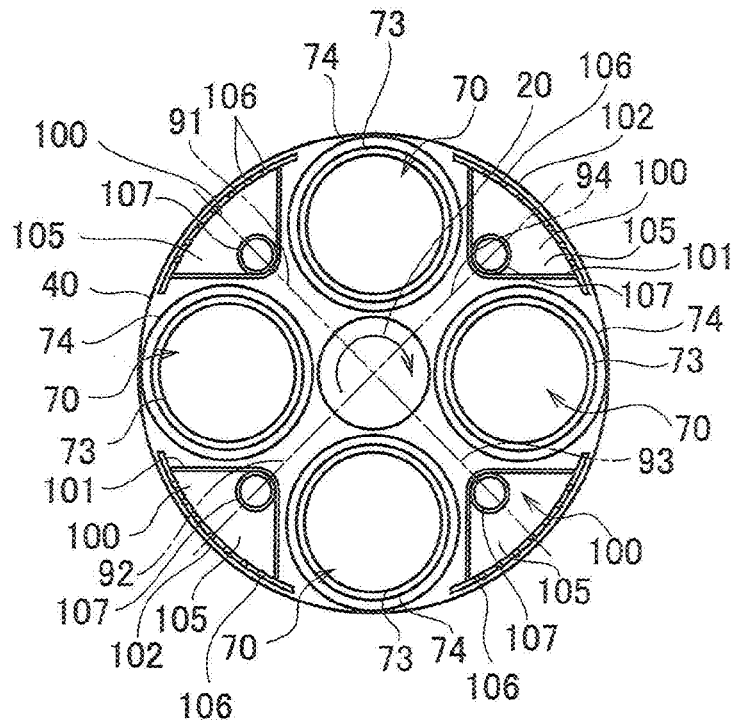
FIG. 4 is a cross-sectional view of the embodiment of the main roll taken along the IV-IV line of FIG. 2.

As shown in FIGS. 2 to 4, the sheet film forming roll 10 includes a center rotary shaft 20, an external cylinder (a thin sleeve) 40, four rolling rubber rolls 70 and four heating medium supplying and discharging mechanisms 100.

The center rotary shaft 20 is rotatably supported in a way that its end portions 21, 22 turn on a work-side bearing 23 and a drive-side bearing 24 of the film forming apparatus with bearing members 25, 26 interposed in between, respectively. A timing pulley 27 configured to rotationally drive the center rotary shaft 20 is attached to the end portion 22 side of the center rotary shaft 20. The timing pulley 27 is coupled to an electric motor (whose illustration is omitted) by use of a timing belt, which is not illustrated. Thus, the timing pulley 27 is rotationally driven by the electric motor.

The center rotary shaft 20 supports a disc-shaped work-side end plate (a fixed end plate) 28 and a disc-shaped drive-side end plate (a fixed end plate) 29 at their respective two locations away from each other in the axial direction (in the left-right direction in FIGS. 2 and 3) with a ball bearing 30 interposed between the center rotary shaft 20 and the work-side end plate 28, and with a ball bearing 31 interposed between the center rotary shaft 20 and the drive-side end plate 29. Each of the work-side end plate 28 and the drive-side end plate 29 is an end plate positionable at an index position. The work-side end plate 28 and the drive-side end plate 29 are supported by the work-side bearing 23 and the drive-side bearing 24, respectively. The work-side end plate 28 and the drive-side end plate 29 are concentrically disposed on the center rotary shaft 20 in such a way as to be positionable at the index positions by index positioning units 301 (see FIG. 8), respectively, which will be described later. In this respect, the "concentrically disposed" means that the peripheral surfaces of the work-side bearing 23 and the drive-side bearing 24 are concentric with the center rotary shaft 20.

In addition, the fixed end plates 28, 29 are configured not to rotate while the center rotary shaft 20, the external cylinder 40 and the rolling rubber rolls 70 are rotating (rotating on their respective axes) for the purpose of extending the resin W as described later. On the contrary, the fixed end plates 28, 29 are configured to rotationally move when positioned at index positions by the index positioning units 301, respectively.

The external cylinder 40 is a circular cylindrical body formed of a thin film made of a metal such as a stainless steel. The external cylinder 40 has a flexible thin structure and is elastically deformable. Annular end-portion rigid members 43, 44 are fixedly attached to the left and right end portions of the external cylinder 40 by use of annular retainer band members 41, 42, respectively. The end-portion rigid members 43, 44 are rotatably supported by the work-side end plate 28 and the drive-side end plate 29 with ball bearings 47, 48 interposed in between, respectively. In this respect, the ball bearings 47, 48 are attached to outer peripheral portions of the work-side end plate 28 and the drive-side end plate 29 with bearing fixing rings 45, 46 interposed in between, respectively. This makes the external cylinder 40 disposed concentric with the center rotary shaft 20, and accordingly rotatable about the center axis of the center rotary shaft 20.

Figure 5:
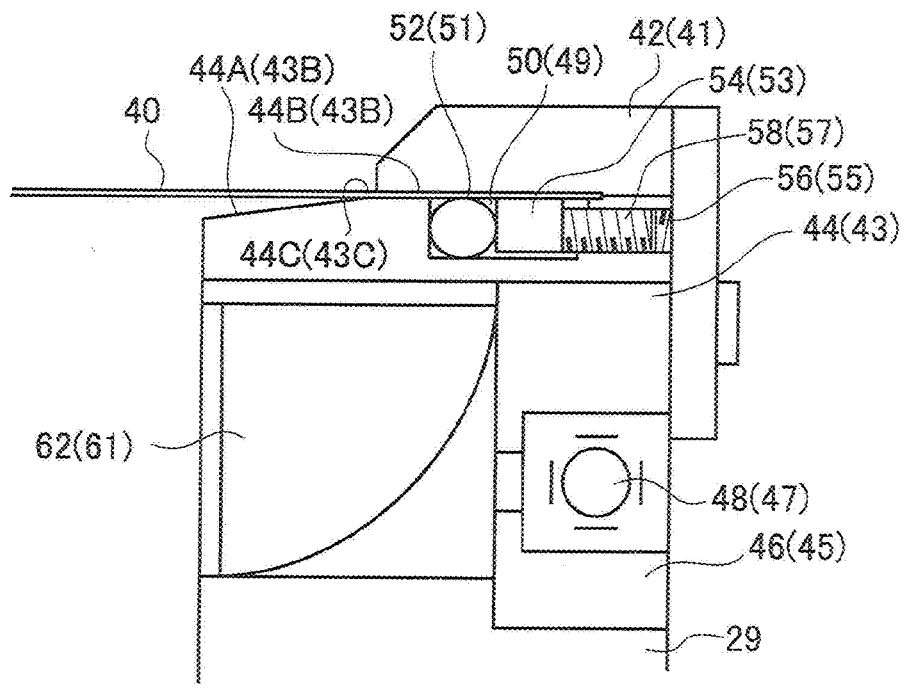
FIG. 5 is a magnified, cross-sectional view of an external cylinder attachment included in the main roll according to the embodiment.

Referring to FIG. 5, detailed descriptions will be provided for structures in which the end-portion rigid members 43, 44 are connected to the external cylinder 40 by use of the retainer band members 41, 42, respectively. The structure in which the end-portion rigid member 43 is connected the external cylinder 40 on the left side and the structure in which the end-portion rigid member 44 is connected to the external cylinder 40 on the right side are symmetrical with each other, and have the same configuration. For this reason, FIG. 5 illustrates the connecting structure on the right side. The connecting structure on the left side will be omitted from FIG. 5, except that the corresponding components are denoted by the same reference numerals.

The end-portion rigid members 43, 44 are inserted and thus fitted into the external cylinder 40 at the respective two axial end portions. Wide concave grooves (peripheral grooves) 49, 50 are formed in the respective outer peripheral portions of the end-portion rigid members 43, 44, where the end-portion rigid members 43, 44 are fitted into the inner peripheral surface of the external cylinder 40. O-rings 51, 52 each made of a rubber-type elastic body are fitted into, and thus attached to, the concave grooves 49, 50, respectively.

The concave grooves 49, 50 are formed as wide O-ring grooves with the following specifications. The depths of the grooves are equal to or larger than the line diameters of the O-rings 51, 52 which are placed in a free measurement condition, respectively. In other words, the grooves are deeper than a normally-specified value by approximately 0.05 mm to 0.3 mm. The width measurements of the grooves are fully wider than the line diameters of the O-rings 51, 52, respectively. In other words, the grooves are approximately 2.0 to 2.5 times as wide as the line diameters thereof. In this respect, the "free measurement condition" means a condition in which the O-rings 51, 52 are not elastically deformed.

Collar members 53, 54 each made of a metal are disposed in the concave grooves 49, 50 in a way that the collar members 53, 54 adjoin the O-rings 51, 52 in the horizontal width direction. Each of the collar members 53, 54 is divided into at least two pieces in order that the collar members 53, 54 should be fitted into the respective concave grooves 49, 50. The collar members 53, 54 are disposed in the concave grooves 49, 50 toward the outsides of the end-portion rigid members 43, 44 from the O-ring 51, 52 in such a way as to adjoin the O-ring 51, 52, respectively (in the case of the concave groove 50 in the right end-portion rigid member 44, the collar member 54 is disposed on the right of the O-ring 52 in such a way as to adjoin the O-ring 52). The collar members 53, 54 are movable in the axial directions (leftward and rightward) in the insides of the concave grooves 49, 50. The outside diameters of the collar members 53, 54 attached to the concave grooves 49, 50 are set at dimensions equal to or smaller than the outside diameters of the end-portion rigid members 43, 44, respectively.

Screw holes 55, 56 are formed in, and thus penetrate, the respective end-portion rigid members 43, 44. The screw holes 55, 56 are opened from the external end surfaces of the end-portion rigid members 43, 44 to the groove-side wall surfaces of the concave grooves 49, 50. The multiple screw holes 55, 56 are provided to each of the end-portion rigid member 43 and 44 in such a way as to be disposed in the circumferential direction of the end-portion rigid member 43, 44. Multiple screw members 57, 58 engage with the respective multiple screw holes 55, 56. The distal ends of the screw members 57, 58 abut on the side surfaces of the collar members 53, 54, respectively. Thus, the screw members 57, 58 press the collar members 53, 54 to the O-ring 51, 52 depending on how far the screw members 57, 58 are screwed into the screw holes 55, 56.

The retainer band members 41, 42 each with a metal-made rigid structure are fitted and thus attached to the outer peripheries of the two axial end portions (corresponding to the concave grooves 49, 50) of the external cylinder 40, respectively. The retainer band members 41, 42 are fitted into the outer periphery of the external cylinder 40, and thus prevent the external cylinder 40 from deforming in such a way as to swell in a direction in which the diameter of the external cylinder 40 expands.

The end-portion rigid members 43, 44 are attached to the external cylinder 40 with the following sequence. First of all, the O-rings 51, 52 and the collar members 53, 54 are fitted into the concave grooves 49, 50, respectively. Subsequently, the screw members 57, 58 are screwed into their respective screw holes to such an loose extent that the screw members 57, 58 do not press their collar members 53, 54 to the corresponding O-rings 51, 52, and that the O-rings 51, 52 are accordingly left in their free measurement condition. Thereafter, the end-portion rigid members 43, 44 are inserted into the external cylinder 40 from the respective opening portions located in the left and right axial ends of the external cylinder 40 with the screw members 57, 58 remaining loosely screwed into their corresponding screw holes, before no retainer band members 41, 42 are attached to the left and right axial end portions of the external cylinder 40.

When the end-portion rigid members 43, 44 are inserted into the external cylinder 40, the O-rings 51, 52 are put in the free measurement condition. For this reason, the depths of the concave grooves 49, 50 are equal to or more than the line diameters of the O-rings 51, 52 which are put in the free measurement condition. Thus, the entire O-rings 51, 52 are accommodated in the insides of the concave grooves 49, 50, and no portions of the O-rings 51, 52 are located in the outsides of the outer peripheral surfaces of the end-portion rigid members 43, 44, respectively. Consequently, the end-portion rigid members 43, 44 can be inserted into the thin external cylinder 40 smoothly and easily with a lower frictional resistance while the O-rings 51, 52 are not pressed against the inner peripheral surface of the external cylinder 40. In addition, it is accordingly possible to avoid the O-rings 51, 52 being damaged when the end-portion rigid members 43, 44 are inserted into the external cylinder 40.

For the purpose of making this insertion work easier, tapered outer peripheral surfaces 43A, 44A which become gradually smaller in diameter toward their ends are formed in the insertion-side end portions of the end-portion rigid members 43, 44. In addition, connection parts 43C and 44C each between a corresponding pair of the tapered outer peripheral surface 43A, 44A and a straight outer peripheral surface 43B, 44B under which the concave groove 49, 50 are formed have curved surfaces.

After the insertion work is completed, the retainer band members 41, 42 are fitted and thus attached to the outer peripheries of the two axial end portions of the external cylinder 40, respectively. Thereafter, the screw members 57, 58 are screwed into their corresponding screw holes. Thereby, the collar members 53, 54 are pressed against the respective O-rings 51, 52. Consequently, the O-rings 51, 52 are elastically deformed. Depending on how far the screw members 57, 58 are screwed into their corresponding screw holes, the O-rings 51, 52 are elastically deformed in a way that the O-rings 51, 52 are compressed between the end-portion rigid members 43, 44 and the external cylinder 40, respectively. The retainer band members 41, 42 prevent the external cylinder 40 from deforming in such a way as to swell due to repulsive forces produced by the elastic deformations of the O-rings 51, 52, respectively.

By this, the end-portion rigid members 43, 44 are fluid-tightly connected to the external cylinder 40 in a way that the end-portion rigid members 43, 44 are immovable relative to the external cylinder 40 because of frictional resistances which occurs between the end-portion rigid members 43, 44 and the external cylinder 40 due to the repulsive forces produced by the elastic deformations of the O-rings 51, 52, respectively. Simultaneously, the retainer band members 41, 42 are connected to the external cylinder 40 in a way that the retainer band members 41, 42 are immovable relative to the external cylinder 40 because of frictional resistances which occur between the retainer band members 41, 42 and the external cylinder 40 due to the repulsive forces produced by the elastic deformations of the O-rings 51, 52.

The fluid-tight connections between the external cylinder 40 and the end-portion rigid members 43, 44 become stable in strength because of the O-rings 51, 52 which are elastically deformed while the retainer band members 41, 42 prevent the external cylinder 40 from deforming in such a way as to swell as described above. In addition, it is also possible to increase the pressure withstanding strengths of the connections between the external cylinder 40 and the end-portion rigid members 43, 44 when the amounts of elastic deformations of the O-rings 51, 52 are increased. The amounts of elastic deformations of the O-rings 51, 52 can be freely set at arbitrary values by controlling how far the screw members 57, 58 are screwed into their corresponding screw holes, respectively.

This connection structure makes it easy to disassemble the end-portion rigid members 43, 44 from the external cylinder 40 when the disassembly work is carried out in a sequence reverse to the sequence in which the insertion work is carried out. Consequently, this connection structure makes the maintainability better.

As shown in FIGS. 2 to 4, the four rolling rubber rolls 70 have the same structure. Each rolling rubber roll 70 is configured as a hollow cylindrical body including: left and right axial end members 71, 72; a metal-made cylindrical body 73 constructed between and integrated with the left and right axial end members 71, 72; and a cylindrical rubber 74 made of a rubber-type elastic body attached to the outer periphery of the metal-made cylindrical body 73.

Each rolling rubber roll 70 is supported by the work-side end plate 28 and the drive-side end plate 29 with a ball bearing 77 interposed between the work-side end plate 28 and a supporting shaft 75 formed in the axial end member 71 of the rolling rubber roll 70, and with a ball bearing 78 interposed between the drive-side end plate 29 and a supporting shaft 76 formed in the axial end member 72 of the rolling rubber roll 70, in a way that the rubber roll 70 is rotatable about its own axis.

The four rolling rubber rolls 70 are disposed about the center axis of the center rotary shaft 20 at equal intervals of a rotational angle of 90 degrees. The four rolling rubber rolls 70 slidingly contact (press-contact) the outer peripheral surface of the center rotary shaft 20 with their respective cylindrical rubbers 74 interposed in between. In addition, the four rolling rubber rolls 70 slidingly contact (press-contact) the inner peripheral surface of the external cylinder 40 with their respective cylindrical rubbers 74 interposed in between.

This makes the rotation of the center rotary shaft 20 transmitted to the rolling rubber rolls 70 due to their frictional forces, and accordingly makes the rolling rubber rolls 70 rotate about their own axes. Thereby, the rotations of the respective rolling rubber rolls 70 are transmitted to the external cylinder 40 due to their frictional forces. Consequently, the external cylinder 40 rotates about the center axis of the center rotary shaft 20.

Not that, while no load is imposed on the external cylinder 40 of the sheet film forming roll 10 (while no external force is imparted to the external cylinder 40 of the sheet film forming roll 10 through the touch roll of the like), the rolling rubber rolls 70 may be set up in such a way as to be in contact with neither the center rotary shaft 20 nor the external cylinder 40 by making a small gap between each rolling rubber roll 70 and the center rotary shaft 20, as well as between each rolling rubber roll 70 and the external cylinder 40.

In a case where, as shown in FIG. 4, the center rotary shaft 20 is driven in the clockwise direction by the motor, each rolling rubber rolls 70 rolls in the counterclockwise direction, and the external cylinder 40 accordingly rotates in the counterclockwise direction.

A hydraulic pressure supplying port 83 is formed in the axial end member 72 of each rolling rubber roll 70. A hydraulic pressure supplier 84 located outside of the roll is connected to each hydraulic pressure supplying port 83 by use of a corresponding rotary joint 82. The hydraulic pressure supplying ports 83 are configured to introduce hydraulic pressures from the hydraulic pressure suppliers 84 to intra-roll spaces 85, respectively. In other words, the rolling rubber rolls 70 are hollow rolls, and the hydraulic pressures are supplied to the intra-roll spaces 85 through the rotary joints 82, respectively. Thus, the pressures in the intra-roll spaces can be variably set, respectively.

This scheme enables the internal pressures in intra-roll spaces 85 to be variably set by the hydraulic pressures, respectively, even while the rolling rubber rolls 70 are rotating (rolling). Thereby, the rolling rubber rolls 70, the metal-made cylindrical bodies 73 and the cylindrical rubbers 74 are swollen due to the internal pressures in the intra-roll spaces 85, respectively. The external cylinder 40 is correspondingly swollen, and is accordingly crowned variably.

Examples of the material of the cylindrical rubbers 74 include natural rubber, an ethylene propylene rubber, a nitrile rubber, a chloroprene rubber, a silicone rubber, a urethane rubber, a fluorine rubber, a chlorosulphonated polyethylene rubber (Hypalon®), a styrene-butadiene rubber and a butyl rubber.

A mechanical sealing member 59 is fitted into the interstice between the center rotary shaft 20 and the work-side end plate 28, whereas a mechanical sealing member 60 is fitted into the interstice between the center rotary shaft 20 and the drive-side end plate 29. In addition, a mechanical sealing member 61 is fitted into the interstice between the work-side end plate 28 and the end-portion rigid member 43, whereas a mechanical sealing member 62 is fitted into the interstice between the drive-side end plate 29 and the end-portion rigid member 44. Furthermore, a mechanical sealing member 86 is fitted into the interstice between the work-side end plate 28 and the supporting shaft 75, whereas a mechanical sealing member 87 is fitted into the interstice between the drive-side end plate 29 and the supporting shaft 76.

By this, the space inside the external cylinder surrounded by the work-side end plate 28, the drive-side end plate 29, the end-portion rigid members 43, 44 and the external cylinder 40 has a fluid-tight structure in which the center rotary shaft 40 penetrates a center area of the space inside the external cylinder (a fluid-tight structure which is configured to be filled with a heating medium such as water or oil). The annular space with the fluid-tight structure between the external cylinder 40 and the center rotary shaft 20 is divided into four pieces in the circumferential direction of the center rotary shaft 20 and the external cylinder 40 by the four rolling rubber rolls 70. A first heating medium chamber 91, a second heating medium chamber 92, a third heating medium chamber 93 and a fourth heating medium chamber 94 are defined between the adjacent twos of the rolling rubber rolls 70 (see FIGS. 3 and 4).

The heating-medium supplying and discharging mechanism 100 is fixedly disposed in the third heating medium chamber 93. The heating-medium supplying and discharging mechanism 100 includes: a groove-shaped member 101 whose cross-section is shaped like an alphabet V; and an arc-shaped plate member 102 welded to the groove-shaped member 101, and located in a vicinity of the inner peripheral surface of the external cylinder 40. The groove-shaped member 101 and the arc-shaped plate member 102 are provided in such a way as to extend fully in the axial direction of the external cylinder 40. A large number of heating-medium ejection ports 106 are opened throughout the almost entire area of the arc-shaped plate member 102. In other words, a large number of heating-medium ejection ports 106 are provided in such a way as to be distributed in the area almost fully stretching in the axial direction of the external cylinder 40.

The two ends of a connected body including the groove-shaped member 101 and the arc-shaped plate member 102 of each heating-medium supplying and discharging mechanism 100 are fixed to end plates 103, 104. The end plates 103, 104 close the two ends of the connected body including the groove-shaped member 101 and the arc-shaped plate member 102, and thus define a heating-medium supplying chamber 105 of each of the heating-medium supplying and discharging mechanisms 100 in the inside of the connected body.

Each heating-medium supplying and discharging mechanism 100 is provided with a heating-medium supplying and discharging pipe 107. The heating-medium supplying and discharging pipe 107 is fixedly disposed in the inside of the heating-medium supplying chamber 105. The two ends of the heating-medium supplying and discharging pipe 107 jut out of the roll after one end thereof penetrates the end plate 108 and the work-side end plate 28, as well as after the other end thereof penetrates the end plate 109 and the drive-side end plate 29. The heating-medium supplying and discharging pipe 107 is partitioned by a partition plate 110 which is located in the center portion of the heating-medium supplying and discharging pipe 107 in the axial direction. A half of the heating-medium supplying and discharging pipe 107 which is closer to the drive-side end plate 29 constitutes a heating-medium supplying passage 111. The other half of the heating-medium supplying and discharging pipe 107 which is closer to the work-side end plate 28 constitutes a heating-medium discharging passage 112. In addition, an end portion of the heating-medium supplying and discharging pipe 107 which is closer to the drive-side end plate 29 constitutes a heating-medium inlet port 113, whereas the other end portion of the heating-medium supplying and discharging pipe 107 which is closer to the work-side end plate 28 constitutes a heating-medium outlet port 114.

A large number of heating-medium supplying ports 115 opening toward the heating-medium supplying chamber 105 are formed in the heating-medium supplying passage 111 of the heating-medium supplying and discharging pipe 107. A large number of heating-medium discharging ports 116 opening toward the outsides respectively of the groove-shaped member 101 and the heating-medium supplying chamber 105 (toward a corresponding one of the first to fourth heating medium chambers 91 to 94) are formed in the heating-medium discharging passage 112 of the heating-medium supplying and discharging pipe 107.

In each of the first to fourth heating medium chambers 91 to 94, this structure makes the heating medium flow in the following sequence. The heating medium enters the heating-medium supplying passage 111 through the heating-medium inlet port 113, and subsequently enters the heating-medium supplying chamber 105 from the heating-medium supplying passage 111 through the heating-medium supplying ports 115. Thereafter, the heating medium is ejected toward the inner peripheral surface of the external cylinder 40 through the heating-medium ejection ports 106, and thus flows outside the heating-medium supplying chamber 105. Afterward, the heating medium enters the heating-medium discharging passage 112 through the heating-medium discharging ports 116, and is thus discharged to the outside of the heating-medium discharging passage 112 through the heating medium outlet port 114. In other words, the heating medium flows in each of the first to fourth heating medium chambers 91 to 94 independently.

This makes it possible to set the surface temperature of the external cylinder 40 for each of belt-shaped zones corresponding to the first to fourth heating medium chambers 91 to 94 when the temperature of the heating medium supplied to the heating medium supplying and discharging pipe 107 is set for each of the first to fourth heating medium chambers 91 to 94, respectively. In other words, the surface temperature of the external cylinder 40 can be independently set for each of the first to fourth heating medium chambers 91 to 94 defined as temperature controlling zones in the roll rotational direction.

The first to fourth heating medium chambers 91 to 94 are separated from one another by the rolling rubber rolls 70 which are in contact with both the center rotary shaft 20 and the external cylinder 40 with the cylindrical rubbers 74 interposed in between. This scheme offers the sealing effect to each of the first to fourth heating medium chambers 91 to 94. Thereby, no portion of the heating medium leaks from or to the first to fourth heating medium chambers 91 to 94. Otherwise, it is possible to avoid the leakage of the heating medium from or to the first to fourth heating medium chambers 91 to 94 to a maximum extent.

This makes it possible to set the temperatures of the temperature controlling zones obtained respectively for the first to fourth heating medium chambers 91 to 94 precisely and adequately, and accordingly makes it possible to set the surface temperature of the external cylinder 40 for each temperature controlling zones precisely and adequately.

Moreover, in each of the first to fourth heating medium chambers 91 to 94, the heating medium whose temperature is controlled is ejected to the inner peripheral surface of the external cylinder 40 from the large number of heating-medium ejection holes 106 made in the almost entire area of the arc-shaped plate member 102 fully stretching in the axial direction of the external cylinder 40. This ejection scheme makes it possible to set the surface temperature of the external cylinder 40 almost evenly in each of the temperature controlling zones corresponding to the first to fourth heating medium chambers 91 to 94.

This evens out the surface temperature of the external cylinder 40 in each temperature controlling zone without allowing a temperature gradient in the axial direction of the roll to occur in each temperature controlling zone.

In order to clearly vary the surface temperature of the external cylinder 40 from one temperature controlling zone to another in the sheet film forming roll 10 in rotation, the external cylinder 40 is formed with the thinner structure which makes the heat capacity of the external cylinder 40 smaller. Nevertheless, the external cylinder 40 is backed up with the rolling rubber rolls 70 as if backed up with steel liners. For this reason, when a sheet film is cast by use of touch rolls, or when a fine pattern is transferred onto a sheet film, it is possible for each touch roll to press the external cylinder 40 with a fully-secured pressing force, although the external cylinder 40 is thinner in thickness. That is because, if places at which the touch rolls should be located correspond to places at which counterpart rolling rubber rolls 70 of the touch rolls which are situated, the rolling rubber rolls 70 prevents the external cylinder 40 from being deformed.

Thereby, it is possible to vary the surface temperature of the external cylinder 40 of the sheet film forming roll 10 in rotation among the temperature controlling zones defined in the roll circumferential direction, when the sheet film is cast by use of the touch rolls, or when the fine pattern is transferred onto the sheet film.

Note that any one of the first to fourth heating medium chambers 91 to 94 may include no heating medium supplying and discharging mechanism 100. Furthermore, any one of the first to fourth heating medium chambers 91 to 94 may include a heater instead of, or in addition to, the heating medium supplying and discharging mechanism 100.

In this case, such a heating medium chamber is provided with a heater which uses electricity as its heat source. The heater which uses electricity as its heat source is configured as an electric heater configured to produce heat due to Joule heat, or as an induction heater configured to produce heat due to electric resistance heating caused by induced current. Otherwise, such a heating medium chamber may be provided with a heater (a steam heater) which uses steam as its heat source instead of, or in addition to, the heater which uses the electricity as its heat source. Moreover, the heater is provided to such a heating medium chamber, for example, in such a way as to cover the whole span of the heating medium chamber along the axis of the center rotary shaft 20.

As described above, the heating medium chambers 91 to 94 are configured to be filled with the heating medium such as water or oil. The heat emitted by the heater is configured to be transmitted to the external cylinder 40 through the heating medium. The heating medium chamber 91 or 92 can be cited as an example of a heating medium chamber in which to install the heat. The heating medium chamber 93 in which the resin needs to be cooled can be cited as an example of a heating medium chamber in which to install the heating medium supplying and discharging mechanism 100. The heating medium chamber 94 can be cited as an example of a heating medium chamber in which to install neither the heater nor the heating medium supplying and discharging mechanism 100 (see FIG. 6).

Figure 6:
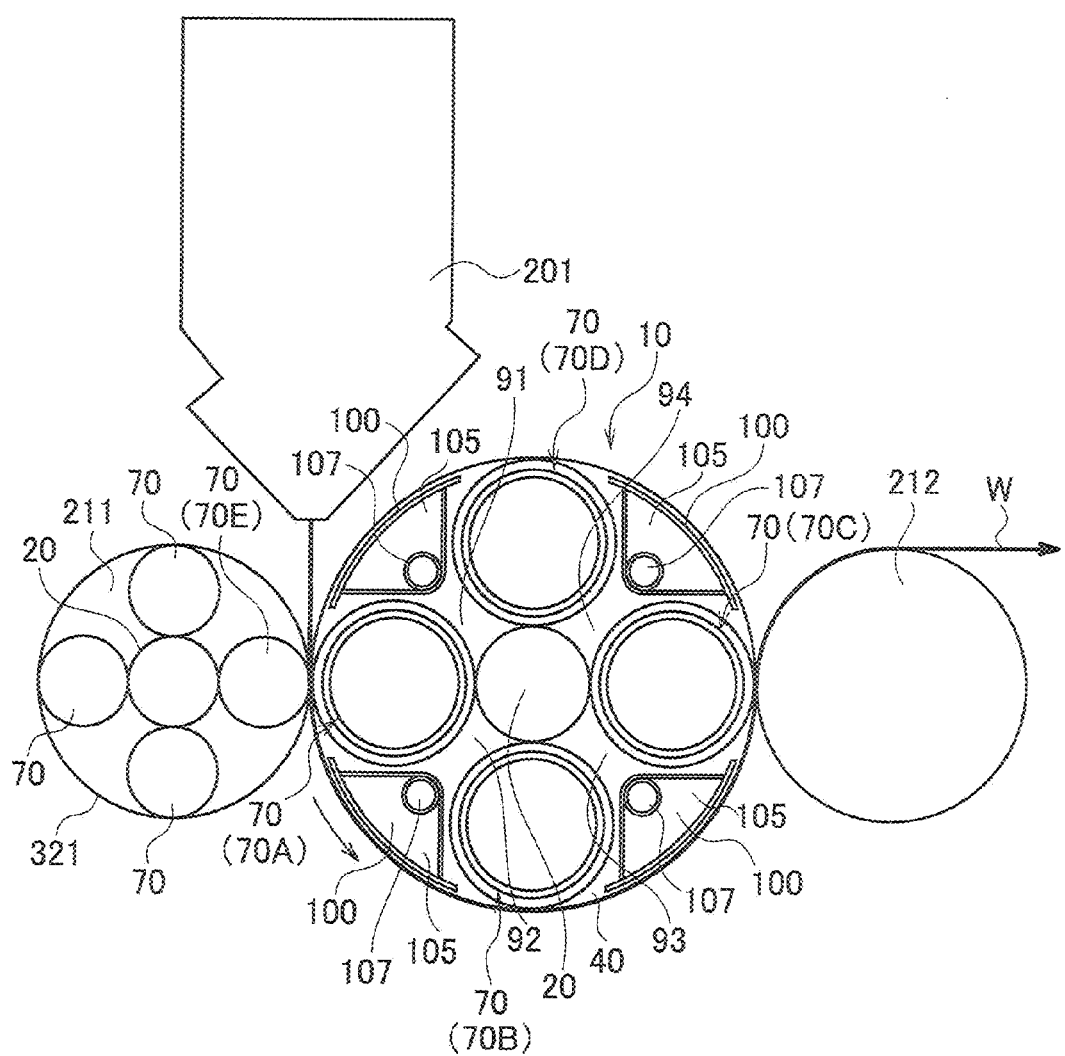
FIG. 6 is a diagram showing an embodiment of a touch-roll type of sheet film casting apparatus.

FIG. 6 shows an embodiment of a touch-roll type of sheet film casting apparatus to which the sheet film forming roll 10 according to the foregoing embodiment is applied as its main roll.

In the case of the sheet film casting apparatus according to the present embodiment, touch rolls 211, 212 are provided corresponding to two horizontally-arranged rolling rubber rolls 70 whose rotational phase positions are different from each other by 180 degrees with respect to the center axis of the sheet film forming roll 10, that is, at locations which make the touch rolls 211, 212 correspond to the two rubber rolls 70 horizontally arranged in the sheet film forming roll 10, respectively.

The molten thermoplastic resin from the T-die 201 is supplied to the interstice of the sheet film forming roll 10 and the touch roll 211 in the downward direction, and is thus sandwiched between the sheet film forming roll 10 and the touch roll 211.

In this case, a part of the place where the touch roll 211 is disposed is a contact starting position at which the thermoplastic resin starts to contact the main roll 10. This contact starting position is situated at a boundary between the first heating medium chamber 91 and the second heating medium chamber 92. A part of the place where the touch roll 212 is disposed is a separation position at which the thermoplastic resin is separated from the main roll 10. This separation position is situated at a boundary between the third heating medium chamber 93 and the fourth heating medium chamber 94.

In conjunction with the rotation of the main roll 10, the thermoplastic resin moves from the contact starting position to the separation position while being in contact with the roll surface of the main roll 10. While moving from the contact starting position to the separation position, the thermoplastic resin sequentially passes the temperature controlling zone of the second heating medium chamber 92, and the temperature controlling zone of the third heating medium chamber 93. Thereby, the thermoplastic resin is cooled and thus hardened.

With regard to the temperature management of the main roll 10 according to the present embodiment, the temperature of the heating medium supplied to the heating medium supplying chamber 105 is set the highest in the first heating medium chamber 91 among the first to fourth heating medium chambers 91 to 94. The temperature of the heating medium supplied to the heating medium supplying chamber 105 is set in such a way as to become gradually lower toward the second heating medium chamber 92 and the third heating medium chamber 93. The temperature of the heating medium supplied to the heating medium supplying chamber 105 in the fourth heating chamber 94 is set slightly higher than the temperature of the heating medium supplied to the heating medium supplying chamber 105 in the third heating medium chamber 93.

With regard to the surface temperature of the external cylinder 40, the temperatures of the temperature controlling zones obtained in the first to fourth heating medium chambers 91 to 94 are almost equal to the temperatures of the heating mediums supplied to the heating medium supplying chambers 105 in the first to fourth heating medium chambers 91 to 94, respectively.

The surface temperature of the touch roll 211 is controlled in order that the surface temperature thereof should be almost equal to the surface temperature of the external cylinder 40 in the temperature controlling zone of the second heating medium chamber 92. The surface temperature of the touch 212 is controlled in order that the surface temperature thereof should be almost equal to the surface temperature of the external cylinder 40 in the temperature controlling zone of the third heating medium chamber 93.

Let us assume that the temperature of the molten resin flowing out of the T-die 201 is 270° C., for example. In this case, the temperature of the heating medium supplied to the heating medium supplying chamber 105 in the first heating medium chamber 91 is set at 160° C. The temperature of the heating medium supplied to the heating medium supplying chamber 105 in the second heating medium chamber 92 is set at 130° C. The temperature of the heating medium supplied to the heating medium supplying chamber 105 in the third heating medium chamber 93 is set at 80° C. The temperature of the heating medium supplied to the heating medium supplying chamber 105 in the fourth heating medium chamber 94 is set at approximately 100° C.

By this, the roll surface temperature of the main roll 10 at the contact starting position where the molten resin having flowed out of the T-die 201 starts to contact the sheet film forming roll 10 is set rather high compared with the case where a sheet film forming roll whose surface temperature does not differ in the roll circumferential direction is used as the main roll. This can make the resin and the roll surface (the surface of the external cylinder 40) in fully-secured contact with each other.

In addition, the roll surface temperature of the sheet film forming roll 10 in the vicinity of the separation position 307 where the cast resin (sheet film W) is separated from the main roll 10 is set rather low compared with the case where a main roll whose surface temperature does not differ in the roll circumferential direction is used as the main roll. This makes it possible to cause the resin to quickly pass the roll surface whose temperature is close to the crystallizing temperature while securing the surface quality of the resin, and accordingly to separate the resultant resin from the roll surface smoothly. These enable the sheet film W to be cast with a higher quality.

Among the rolling rubber rolls 70 provided in the main roll 10, at least one rolling rubber roll 70 is different from the other rolling rubber rolls 70 in terms of the amount of crowing. Specifically, even when no oil is supplied to the rolling rubber rolls 70 through the hydraulic pressure supplying port 83 and internal pressure of the rolling rubber rolls 70 is, for example, almost equal to the atmospheric pressure, at least one rolling rubber roll 70 is different from the other rolling rubber rolls 70 in terms of the amount of crowing. In the case of the sheet film casting apparatus shown in FIG. 6, the amount at which a rolling rubber roll 70A in contact with the touch roll 211 is crowned and the amount at which a rolling rubber roll 70C in contact with the touch roll 212 is crowned are larger than the amount at which the other rolling rubber rolls 70B, 70D are crowned.

The main roll 10 is in contact with the touch roll 211 at a part of its outer peripheral surface corresponding to a part of the inner peripheral surface of the external cylinder 40 with which the rolling rubber roll 70A is in contact. Thus, the main roll 10 is configured in order that the molten resin W should be sandwiched between the main roll 10 and the touch roll 211. Consequently, in a case where the external cylinder 40 receives an external force while the resin W is being sandwiched between the main roll 10 and the touch roll 211, the rolling rubber roll 70A is chiefly configured to receive this external force. The rolling rubber roll 70C is similarly configured.

Figure 9A:
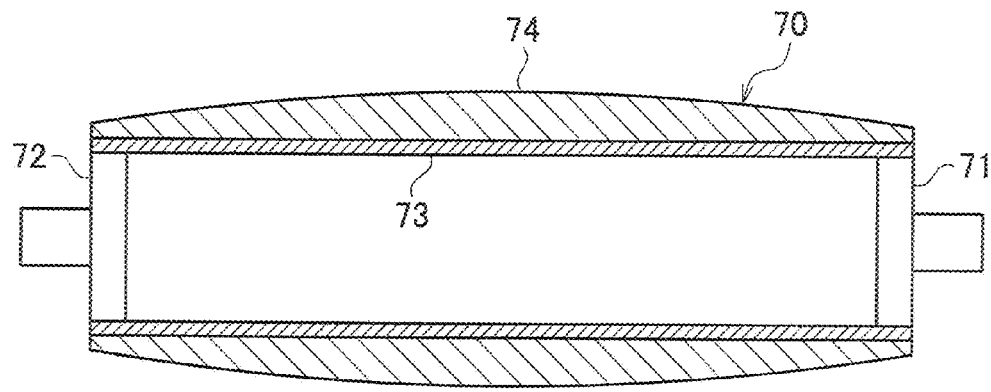
FIGS. 9A to 9C are diagrams used to explain how a rolling rubber roll is crowned.
Figure 9B:
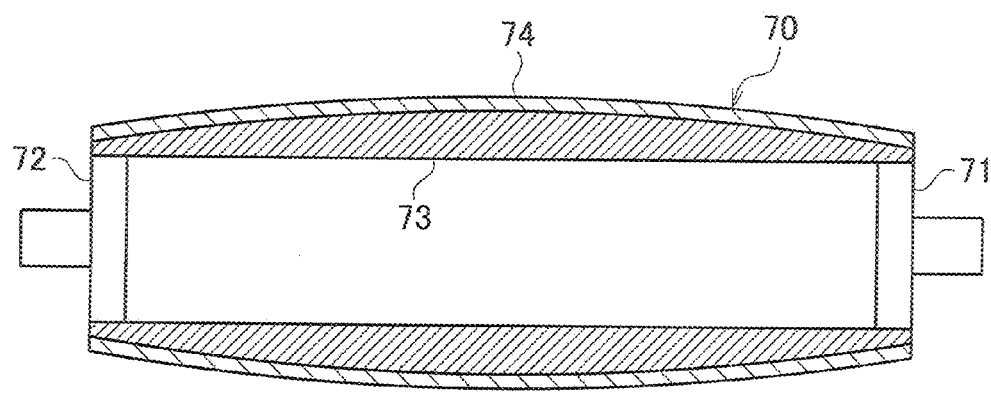
Figure 9C:
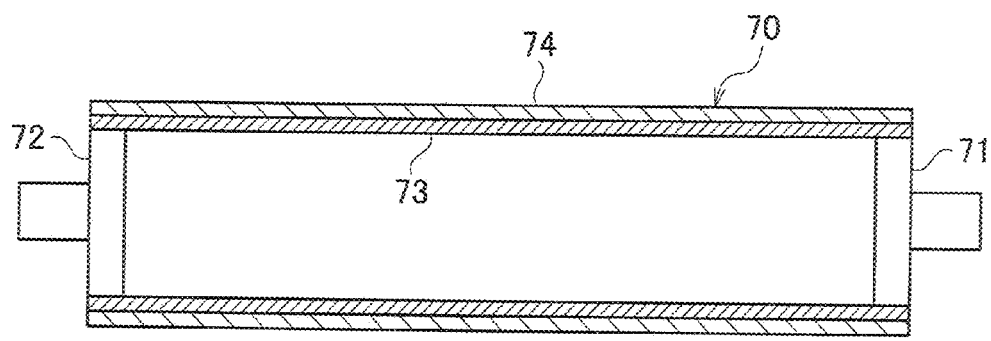

In this respect, referring to FIGS. 9A to 9C, descriptions will be provided for how each rolling rubber roll 70 is crowned.

FIG. 9A is a diagram showing how the rolling rubber roll 70 is crowned by convexing the cylindrical rubber 74 constituting the rolling rubber roll 70 in the axial direction of the cylindrical rubber 74. FIG. 9B is a diagram showing how the rolling rubber roll 70 is crowned by convexing the metal-made cylindrical body 73 constituting the rolling rubber roll 70 in the axial direction of the metal-made cylindrical body 73. FIG. 9C shows the rolling rubber roll 70 which is not crowned. The rolling rubber roll 70 shown in FIG. 7C is shaped like a cylinder. Note that the rolling rubber roll 70 may be crowned by convexing both the cylindrical rubber 74 and the metal-made cylindrical body 73.

The thus-configured touch-roll type of sheet film casting apparatus (see FIG. 6) is capable of forming a sheet film more adequately than ever, because the rolling rubber rolls 70 are different from one another in terms of the amount of crowning. Specifically, as long as the amount at which the rolling rubber roll 70A is crowned and the amount at which the rolling rubber roll 70C is crowned are set larger than the amount at which the other rolling rubber rolls 70B, 70D are crowned, it is possible to suppress the deformation of the main roll 10 to the minimum even if the rolling rubber rolls 70A, 70C in contact with the touch rolls 211, 212 receive larger forces than the other rolling rubber rolls 70B, 70D while the resin W is being sandwiched between the main roll 10 and each of the touch rolls 211, 212.

The foregoing descriptions have been provided for the case where, among the multiple rolling rubber rolls 70, the two rolling rubber rolls 70 are crowned whereas the other rolling rubber rolls 70 are not crowned. However, all the rolling rubber rolls 70 may be crowned with a condition that the amount of crowning is larger or smaller in at least one rolling rubber roll than in the other rolling rubber rolls.

The touch-roll type of sheet film casting apparatus shown in FIG. 6 includes index positioning units 301 capable of positioning the fixed end plates 28, 29 (rolling rubber rolls 70) at the respective index positions.

Each index positioning unit 301 includes an index positioning mechanism including a positioning pin 303.

Figure 8:
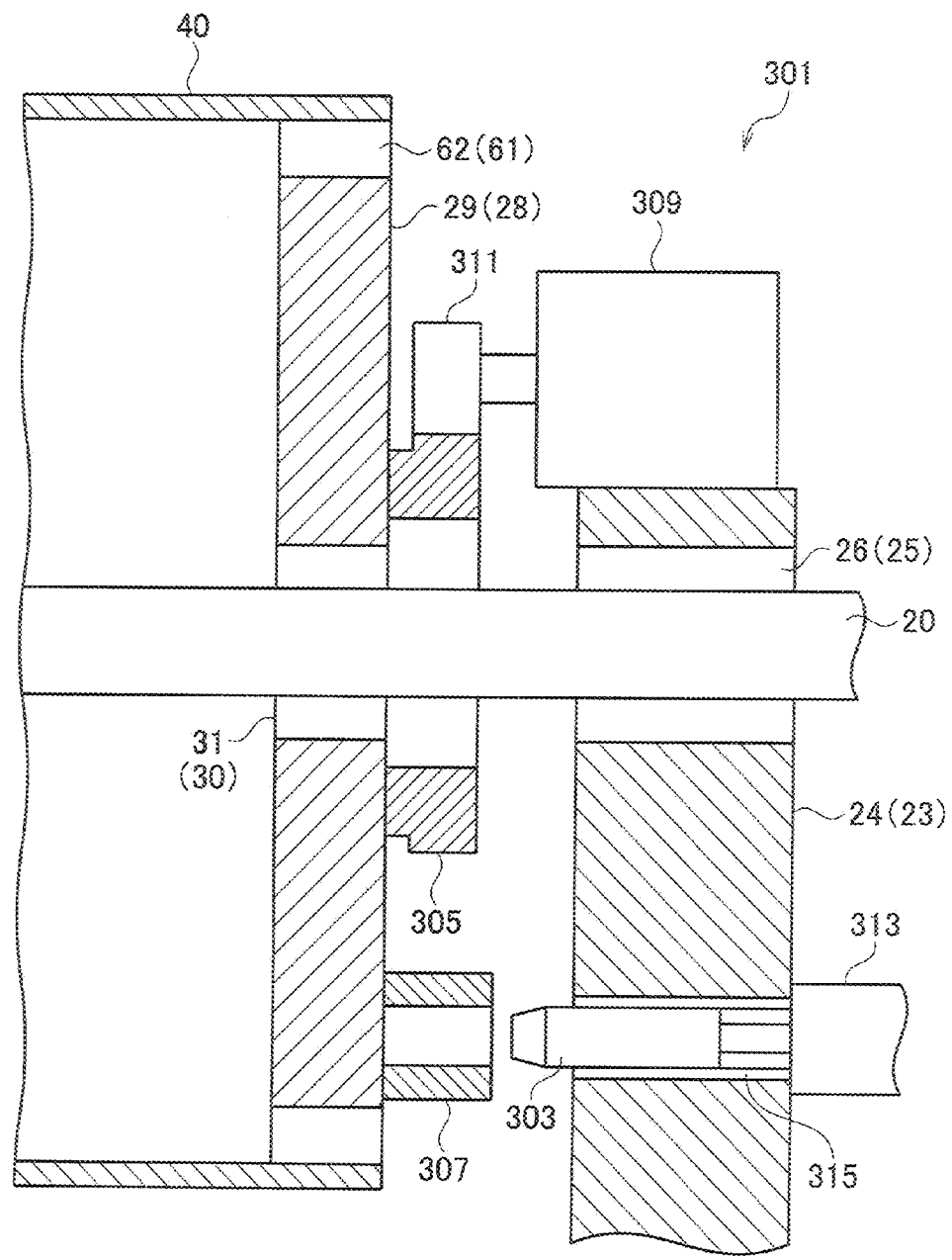
FIG. 8 is a diagram showing an example of a configuration of an index positioning unit.

Referring to FIG. 8, descriptions will be provided for the index positioning unit 301 by giving an example of it. The drive-side end plate 29 integrally includes: a single large gear 305; and positioning pin engagement members 307 each including a hole which the positioning pin 303 enters (the inner diameter of the hole is a slightly larger than the outer diameter of the positioning pin 303). The single large gear 305 is located concentric with the center rotary shaft 20. On the other hand, corresponding to the rolling rubber rolls 70, four positioning pin engagement members 307, for example, are respectively located in places which equally divide the circumference of the drive-side end plate 29.

The bearing member 24 is integrally provided with a housing for an actuator 309 such as a servo motor. A rotary output shaft of the actuator 309 is integrally provided with a small gear 311. The small gear 311 meshes with the large gear 305.

In addition, the bearing member 24 is integrally provided with a housing for an actuator 313 such as a fluid pressure cylinder. The positioning pin 303 is integrally provided to a front end of a piston rod of the fluid pressure cylinder 313. The positioning pin 303 is slidably supported by the bearing member 24 with a bush 315 interposed in between.

The large gear 305 and the positioning pin engagement members 307 are positioned so that the large gear 305 and the positioning pin engagement members 307 do not interfere with the rolling rubber rolls 70 and the like. In addition, the work-side end plate 28 is similarly provided with a large gear 305, positioning pin engagement members 307 and a gear 311. On the other hand, the work-side bearing member 23 is similarly provided with a positioning pin 303, a servo motor 309, a fluid pressure cylinder 313 and a bush 315.

The main roll 10 is positioned at an index position as follows. Under the control of a controller (not illustrated), the servo motors 309 (the servo motor provided at the side of the bearing member 24 and the servo motor provided at the side of the bearing member 23) are rotated in synchronism with each other while the positioning pin 303 is away from all the positioning pin engagement members 307. Thereby, the main roll 10 is rotated and thus positioned. At this time, the fluid pressure cylinder 313 pushes the positioning pin 303, and thus causes the positioning pin 303 to engage with one of the positioning pin engagement members 307.

Note that the main roll 10 may be rotated manually in a case where the actuators 309 such as the servo motors are eliminated from the respective index positioning units 301.

Since the touch-roll type of sheet film casting apparatus shown in FIG. 6 includes the index positioning units 301, the touch-roll type of sheet film casting apparatus is capable of positioning the rolling rubber rolls 70 at the respective index positions even though different amounts of crowning are set for the respective rolling rubber rolls 70 depending on the type of a resin W to be formed into a sheet film. Accordingly, the touch-roll type of sheet film casting apparatus is capable of forming the resin W into the sheet film more adequately than ever.

In the case of the touch-roll type of sheet film casting apparatus shown in FIG. 6, different amounts of crowning are set for the respective rolling rubber rolls 70. Instead, however, none of the rolling rubber rolls 70 may be crowned. Otherwise, the same amount of crowning may be applied to all the rolling rubber rolls 70.

In a case where the rubber wears away in one of the rolling rubber rolls 70, this scheme enables the rolling rubber roll 70 whose rubber wears away to be easily switched with any of the other rolling rubber rolls 70 by use of the index positioning units 301. Accordingly, the touch-roll type of sheet film casting apparatus shown in FIG. 6 is capable of forming a sheet film precisely for a longer period of time.

Rolls each made with a configuration similar to that of the main roll 10 including the rolling rubber rolls 70 and the like may be employed as the touch rolls 211, 212 (see FIG. 6).

In this case, a part of the outer peripheral surface of the touch roll 211 is in contact with the main roll 10 in order for the molten resin W to be sandwiched between the touch roll 211 and the main roll 10. In this respect, the part of the outer peripheral surface of the touch roll 211 corresponds to a part of the inner peripheral surface of the external cylinder 321; and at the part of the inner peripheral surface of the external cylinder 321, the rolling rubber roll 70E is inscribed in the external cylinder 321. Furthermore, as understood from FIG. 6, the center axis on which the external cylinder 321 of the touch roll 211 rotates, the center axis on which one 70E of the rolling rubber rolls 70 included in the touch roll 211 rotates, the center axis on which the external cylinder 40 of the main roll 10 rotates, the center axis on which one 70A of the rolling rubber rolls included in the main roll 10 rotates, and the contact portion between the external cylinder 40 of the main roll 10 and the external cylinder 321 of the touch roll 211 are located on an almost straight line. Consequently, in a case where the external cylinders 40, 321 receive their respective external forces while sandwiching the resin W, these forces are designed to be absorbed mainly by the rolling rubber rolls 70A, 70E as well as the center rotary shafts 20, 20 respectively of the touch roll 211 and the main roll 10.

FIG. 6 shows the four rolling rubber rolls 70 which are disposed in the touch roll 211 in an equally-distributed manner. Instead, as shown in FIG. 7, two, three, five or more rolling rubber rolls 70 may be disposed in the touch roll 211 in a manner deemed necessary.

The touch roll 212 is configured in the same manner as the touch roll 211 is configured. In addition, the rolling rubber rolls 70 included in each of the touch rolls 211, 212 may be crowned like the rolling rubber rolls 70 included in the main roll 10 in some cases. Furthermore, index positioning units 301 may be included in each of the touch rolls 211, 212 like in the main roll 10 in some cases.

Figure 7:
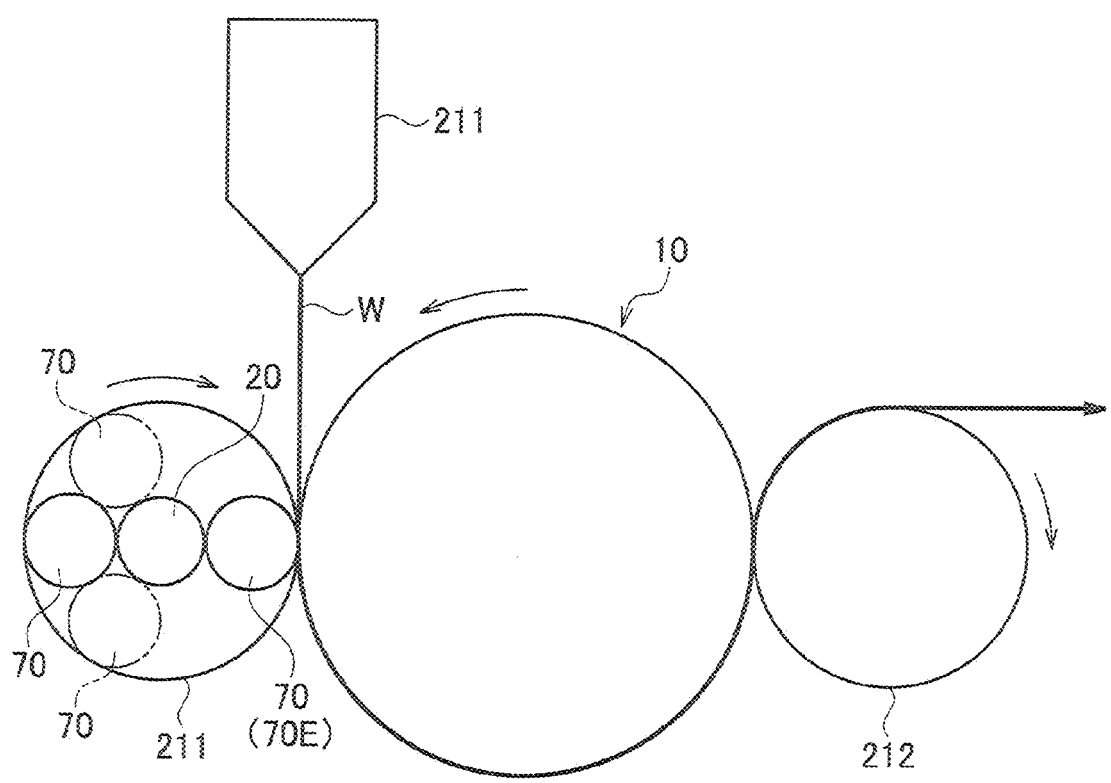
FIG. 7 is a diagram showing how rolling rubber rolls 70 are disposed beside the touch-roll type of sheet film casting apparatus of FIG. 6.

In the case of a touch-roll type of sheet film casting apparatus shown in FIG. 7, the rigidities of the respective touch rolls 211, 212 are higher than ever. That is because each of the touch rolls 211, 212 includes multiple rolling rubber rolls 70 in the inside of its external cylinder 321. In addition, parts of the outer peripheral surfaces of the touch rolls 211, 212 are in contact with the main roll 10 in a way that the parts of the outer peripheral surfaces thereof correspond to parts of the inner peripheral surfaces of the their external cylinders 321, respectively. In this respect, at the parts of the inner peripheral surfaces thereof, the rolling rubber rolls 70 are inscribed in their external cylinders 321, respectively. Consequently, even in a case where the touch-roll type of sheet film casting apparatus shown in FIG. 7 forms the resin W into a wider sheet film, the touch-roll type of sheet film casting apparatus suppresses to the minimum the deformations of the touch rolls 211, 212 and the main roll 10 between which the resin W is sandwiched, and thus enables the resin W to receive pressing forces which are even in the width direction of the resin W.

Figure 10:
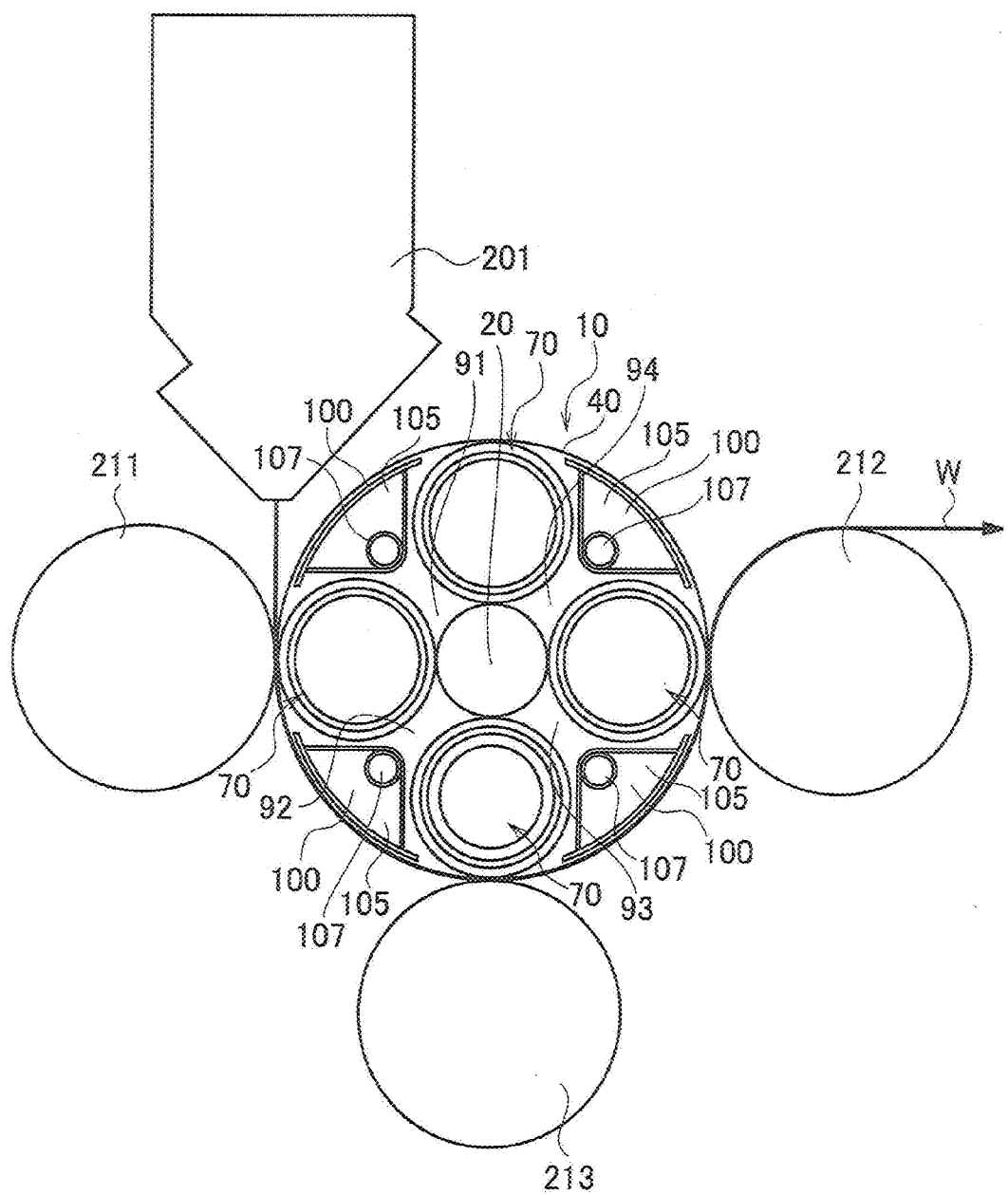
FIG. 10 is a diagram showing another embodiment of the touch-roll type of sheet film casting apparatus.

FIG. 10 shows another embodiment of the touch-roll type of sheet film casting apparatus, which has another touch roll 213 in a place corresponding to a rolling rubber roll 70 located at a boundary between the second heating medium chamber 92 and the third heating medium chamber 93 in addition to the touch rolls 211, 212. The touch roll 213 is configured in the same manner as the touch rolls 211, 212 are configured in such a way as to include the rolling rubber rolls 70 and the like.

In this case, the roll surface temperature of the main roll 10 and the roll surface temperature of the touch roll 211 may be respectively equal to those according to the foregoing embodiment shown in FIG. 6. The roll surface temperature of the touch roll 213 is set almost equal to the surface temperature of the external cylinder 40 in the temperature controlling zone of the third heating medium chamber 93. The roll surface temperature of the touch roll 212 located in the separation position is set lower than the surface temperature of the external cylinder 40 in the temperature controlling zone in the third heating medium chamber 93. For example, when the temperature of the heating medium supplied to the heating medium supplying chamber 105 in the third heating medium chamber 93 is 80° C., the roll surface temperature of the touch roll 212 is set at approximately 40° C.

This decreases the temperature of the resin separated from the main roll 10, and accordingly fully cools the resin while the resin is being cast. This enables the resin to be separated from the roll surface more smoothly.

Figure 11:
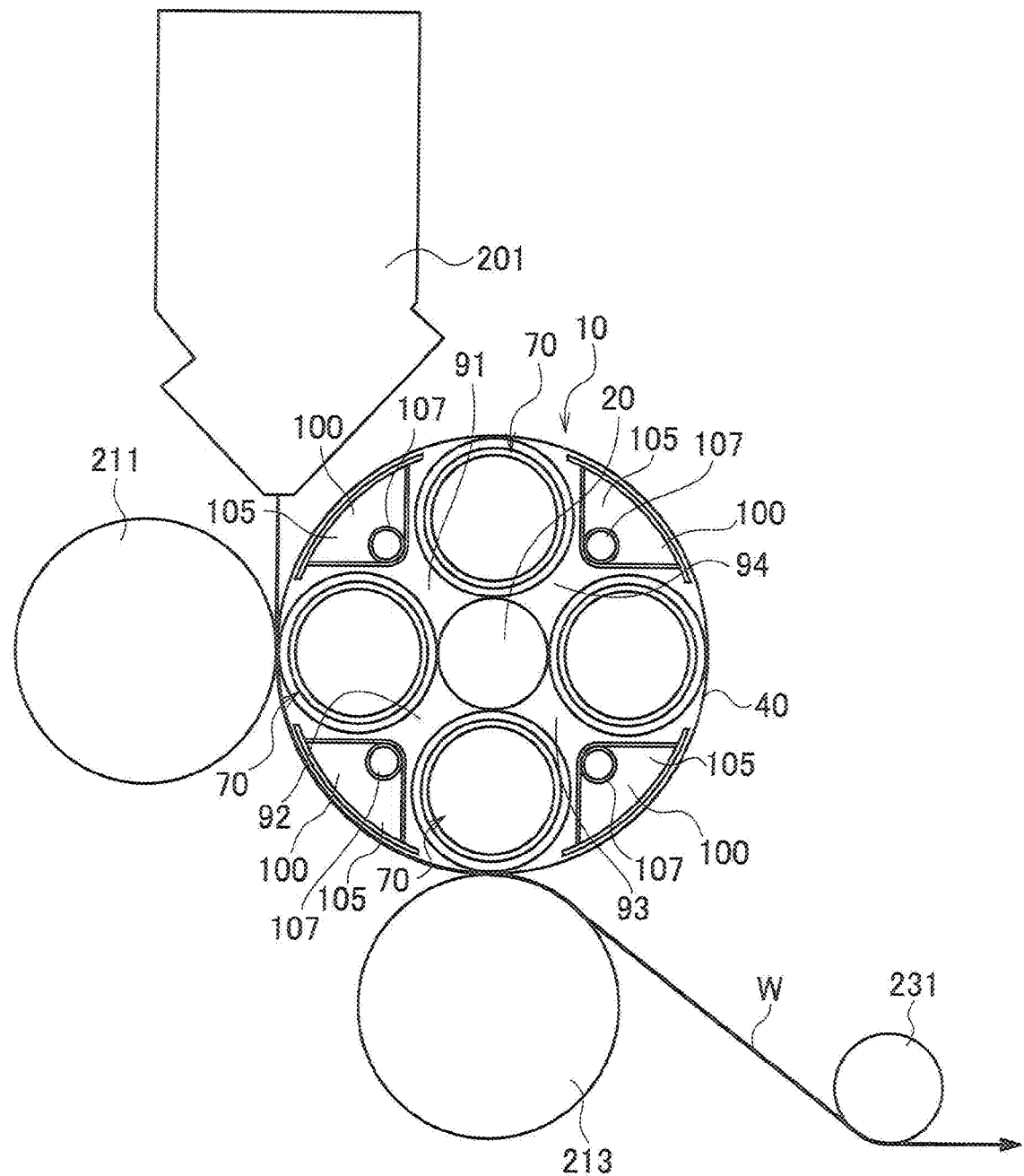
FIG. 11 is a diagram showing yet another embodiment of the touch-roll type of sheet film casting apparatus.

FIG. 11 shows yet another embodiment of the touch-roll type of sheet film casting apparatus. In this embodiment, the touch rolls 211, 213 are provided corresponding to two horizontally-arranged rolling rubber rolls 70 whose rotational phase positions are different from each other by 90 degrees with respect to the center axis on which the main roll 10 rotates.

In this case, the contact staring position is the same as that in the touch-roll type of sheet film casting apparatus according to the foregoing embodiment. On the contrary, a part of the place where the touch roll 213 is disposed is a position at which the thermoplastic resin is separated from the main roll 10. This separation position is situated at the boundary between the second heating medium chamber 92 and the third heating medium chamber 93.

With regard to the temperature management of the main roll 10 according to the present embodiment, the temperature of the heating medium supplied to the heating medium supplying chamber 105 is set the highest in the first heating medium chamber 91 among the first to fourth heating medium chambers 91 to 94. The temperature of the heating medium supplied to the heating medium supplying chamber 105 is set in such a way as to become gradually lower toward the second heating medium chamber 92 and the third heating medium chamber 93. The temperature of the heating medium supplied to the heating medium supplying chamber 105 is not managed in the fourth heating medium chamber 94 in particular.

For example, when the temperature of the molten resin flowing out of the T-die 201 is 270° C., the temperature of the heating medium supplied to the heating medium supplying chamber 105 in the first heating medium chamber 91 is set at 130° C.; the temperature of the heating medium supplied to the heating medium supplying chamber 105 in the second heating medium chamber 92 is set at 90° C.; the temperature of the heating medium supplied to the heating medium supplying chamber 105 in the third heating medium chamber 93 is set at 40° C.; the roll surface temperature of the touch roll 211 is set at 90° C.; and the roll surface temperature of the touch roll 213 is set at approximately 40° C.

The resin is cooled more quickly in the present embodiment than in the foregoing embodiment. For this reason, the present embodiment is suitable for casting a sheet film made of a thermoplastic resin suitable for a quick cooling process.

The sheet film W separated from the main roll 10 is guided by a guide roller 213 (touch roll 213), and is thus moved to the ensuing step.

Figure 12:
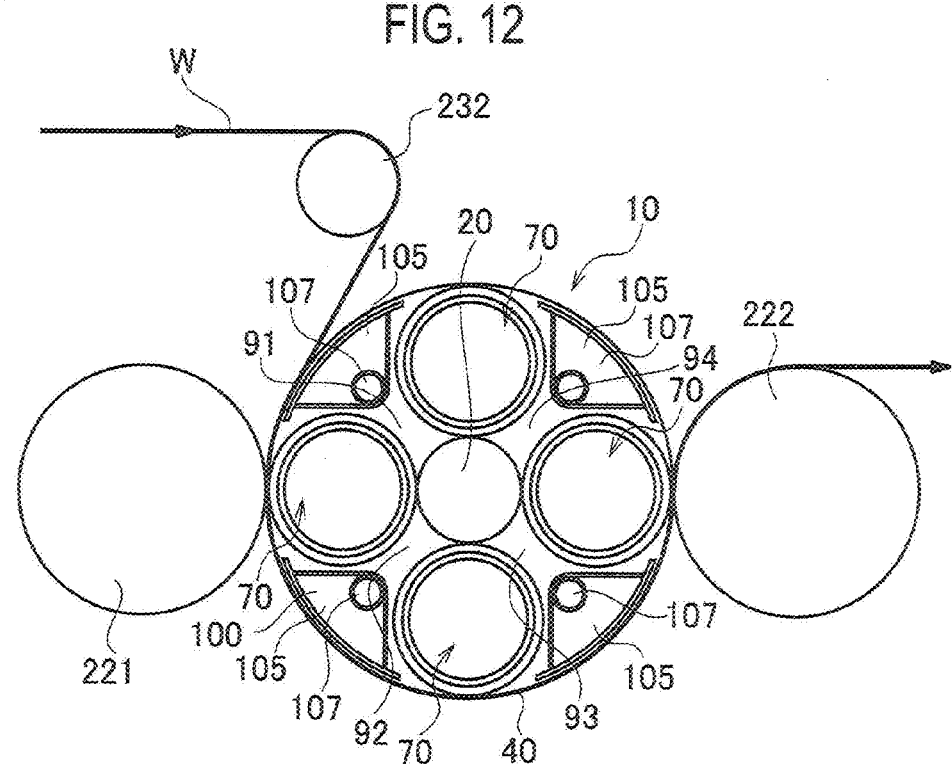
FIG. 12 is a diagram showing an embodiment of a fine pattern transferring apparatus.

FIG. 12 shows an embodiment of a fine pattern transferring apparatus.

The fine pattern transferring apparatus transfers and thus forms a fine pattern of an emboss or the like onto a surface of a reheated sheet film W made a thermoplastic resin. To this end, a fine pattern as a reverse model for the fine pattern to be transferred onto the sheet film W is formed on the surface of the external cylinder 40 of the main roll 10 used for the fine pattern transferring apparatus.

In the case of the fine pattern transferring apparatus according to the present embodiment, touch rolls 221, 222 are provided corresponding to two horizontally-arranged rolling rubber rolls 70 whose rotational phase positions are different from each other by 180 degrees with respect to the center axis on which the main roll 10 rotates, that is, in locations which make the touch rolls 221, 222 correspond to the two rubber rolls 70 horizontally arranged in the main roll 10, respectively. Note that the touch rolls 221, 222 are configured in the same manner as the touch rolls 211, 212 are configured in such a way as to include the rolling rubber rolls 70 and the like.

The sheet film W is guided by a guide roll 232, and is thus sent to the roll surface of the main roll 10. Thereafter, the sheet film W is sent in such a way as to be wound around a part of the roll surface of the main roll 10. A part of the place at which the touch roll 221 is disposed is a transfer starting position. This transfer starting position is located at a boundary between the first heating medium chamber 91 and the second heating medium chamber 92. A part of the place at which the touch roll 222 is disposed is a separation position at which the thermoplastic resin is separated from the main roll 10. This separation position is located at a boundary between the third heating medium chamber 93 and the fourth heating medium chamber 94.

With regard to the temperature management of the main roll 10 according to the present embodiment, the temperature of the heating medium supplied to the heating medium supplying chamber 105 is set the highest in the first heating medium chamber 91 among the first to fourth heating medium chambers 91 to 94. The temperature of the heating medium supplied to the heating medium supplying chamber 105 is set in such a way as to become gradually lower toward the second heating medium chamber 92 and the third heating medium chamber 93. The temperature of the heating medium supplied to the heating medium supplying chamber 105 is set slightly higher in the fourth heating medium chamber 94 than in the third heating medium chamber 93.

With regard to the surface temperature of the external cylinder 40, the temperatures of the temperature controlling zones obtained in the first to fourth heating medium chambers 91 to 94 are almost equal to the temperatures of the heating mediums supplied to the heating medium supplying chambers 105 in the first to fourth heating medium chambers 91 to 94, respectively.

The surface temperature of the touch roll 221 is controlled in order that the surface temperature thereof should be almost equal to the surface temperature of the external cylinder 40 in the temperature controlling zone of the second heating medium chamber 92. The surface temperature of the touch roll 222 is controlled in order that the surface temperature thereof should be almost equal to the surface temperature of the external cylinder 40 in the temperature controlling zone of the third heating medium chamber 93.

For example, the temperature of the heating medium supplied to the heating medium supplying chamber 105 in the first heating medium chamber 91 is set at 160° C.; the temperature of the heating medium supplied to the heating medium supplying chamber 105 in the second heating medium chamber 92 is set at 130° C.; the temperature of the heating medium supplied to the heating medium supplying chamber 105 in the third heating medium chamber 93 is set at 80° C.; and the temperature of the heating medium supplied to the heating medium supplying chamber 105 in the fourth heating medium chamber 94 is set at approximately 100° C.

By this, the sheet film W having been sent to the roll surface of the main roll 10 under the guidance of the guide roll 232 is pre-heated by the temperature controlling zone in the first heating medium chamber 91 which is set at the highest temperature, while the sheet film W is moving from the contact starting position at which the sheet film W starts to contact the roll surface of the main roll 10 to the transfer starting position at which the fine pattern is transferred onto the roll surface of the main roll 10. As a result of pre-heating the sheet film W in this manner, the temperature of the sheet film W at the transfer starting position becomes equal to or higher than the glass transition temperature. At the transfer starting position, the sheet film W is pressed against the roll surface of the main roll 10 by the touch roll 221, and the fine pattern formed on the roll surface is transferred to the sheet film W. Thereafter, the resultant sheet film W moves to the separation position in accordance with the rotation of the main roll 10 while wound around the part of the roll surface of the main roll 10. During this movement, the sheet film W sequentially passes the temperature controlling zone in the second heating medium chamber 92 and the temperature controlling zone in the third heating medium chamber 93. Thereby, the sheet film W is cooled to a temperature equal to or lower than the glass transition temperature.

By this, the roll surface temperature of the sheet film forming roll 10 before the transfer starting position, or the temperature of the temperature controlling zone which is set the highest by the first heating medium chamber 91 configured to pre-heat the sheet film W, can be set rather high compared with the case where a main roll whose surface temperature does not differ in the roll circumferential direction is used for the fine pattern transferring apparatus. This makes it possible to fully raise the temperature of the sheet film W to the temperature equal to or higher than the glass transition temperature. This temperature raise enables the fine pattern to be transferred to the sheet film W with full precision.

The roll surface temperature near the separation position where the sheet film W onto which the fine pattern has been transferred is separated from the main roll 10 can be set rather low compared with the case where the main roll whose surface temperature does not differ in the roll circumferential direction is used for the fine pattern transferring apparatus. This makes it possible to fully cool the sheet film W. This full cooling enables the sheet film W to be separated from the roll surface after the fine pattern having been transferred to the sheet film W is fully hardened and thus fixed to the sheet film W. Consequently, the sheet film forming roll 10 used as the main roll thereof can transfer the fine pattern onto the sheet film W securely and precisely, and accordingly can offer the sheet film W onto which the fine pattern is transferred with high quality.

Figure 13:
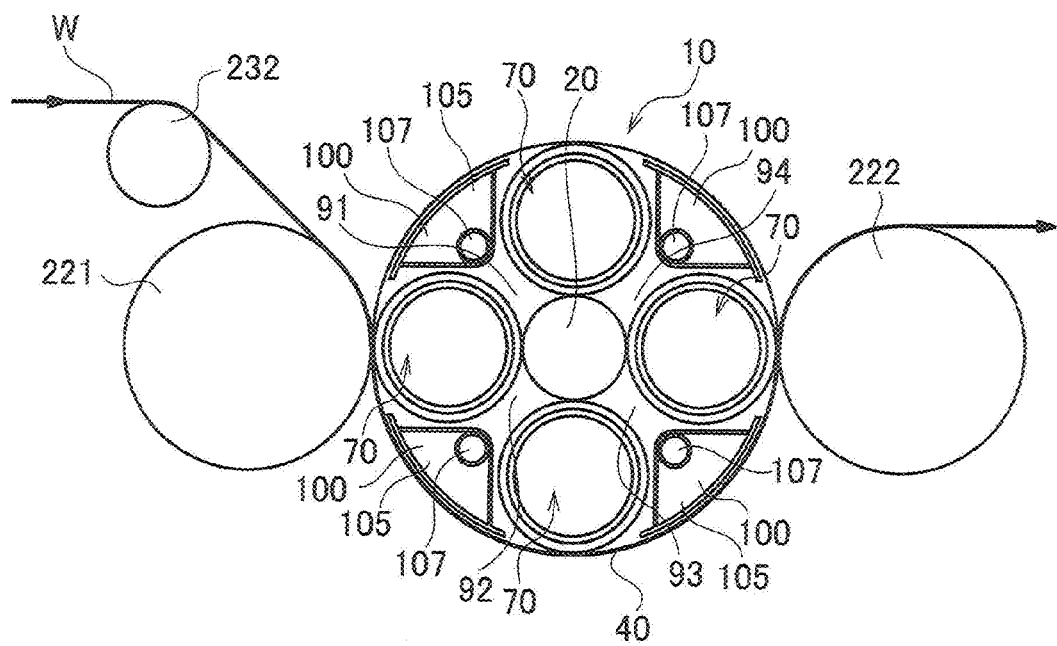
FIG. 13 is a diagram showing another embodiment of the fine pattern transferring apparatus.

FIG. 13 shows another embodiment of the fine pattern transferring apparatus.

In this embodiment, the sheet film W is guided by the guide roll 232, and is thus sent to the transfer starting position at which the touch roll 221 transfers the fine pattern onto the sheet film W. This embodiment is suitable for transferring the fine pattern onto the sheet film W through a step substantially not requiring the sheet film W to be pre-heated, and for transferring the fine pattern onto a thermoplastic resin whose glass transition temperature is lower.

Figure 14:
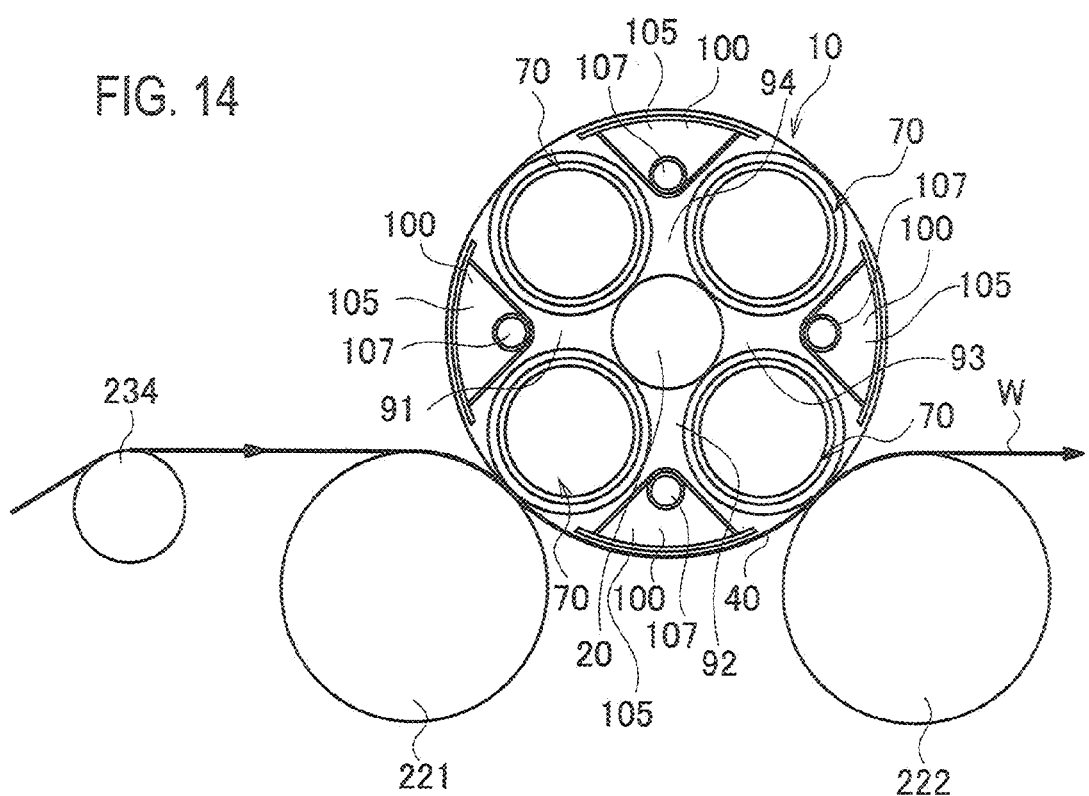
FIG. 14 is a diagram showing yet another embodiment of the fine pattern transferring apparatus.

FIG. 14 shows yet another embodiment of the fine pattern transferring apparatus.

In this embodiment, the touch rolls 221, 222 are provided corresponding to two rolling rubber rolls 70 whose rotational phase positions are different from each other by 90 degrees with respect to the center axis on which the main roll 10 rotates.

The sheet film W is guided by a guide roll 234, and is thus sent to the transfer starting position at which the touch roll 221 starts to transfer the fine pattern onto the sheet film W. The sheet film W is separated from the main roll 10 by the touch roll 222 at the separation position. The transfer starting position is located at a boundary between the first heating medium chamber 91 and the second heating medium chamber 92. The separation position is located at a boundary between the second heating medium chamber 92 and the third heating medium chamber 93.

With regard to the temperature management of the main roll 10 according to the present embodiment, as well, the temperature of the heating medium supplied to the heating medium supplying chamber 105 is set the highest in the first heating medium chamber 91 among the first to fourth heating medium chambers 91 to 94. The temperature of the heating medium supplied to the heating medium supplying chamber 105 is set in such a way as to become gradually lower toward the second heating medium chamber 92 and the third heating medium chamber 93. The temperature of the heating medium supplied to the heating medium supplying chamber 105 in the fourth heating medium chamber 94 is set slightly higher than the temperature of the heating medium supplied to the heating medium supplying chamber 105 in the third heating medium chamber 94. In addition, the surface temperature of the touch roll 221 is controlled in order to be almost equal to the surface temperature of the external cylinder 40 in the temperature controlling zone of the second heating medium chamber 92. The surface temperature of the touch roll 222 is controlled in order to be almost equal to the surface temperature of the external cylinder 40 in the temperature controlling zone of the third heating medium chamber 93.

This embodiment is suitable for transferring a fine pattern onto a sheet film W at a high speed through a step substantially not requiring the sheet film W to be pre-heated.

Figure 15:
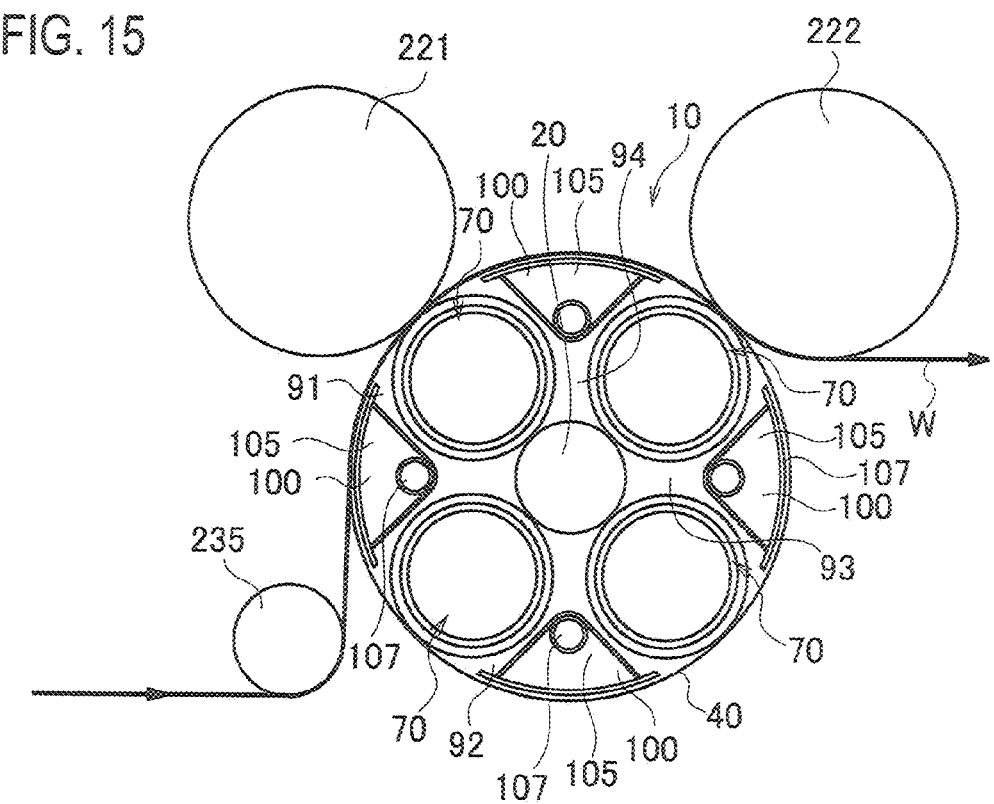
FIG. 15 is a diagram showing still another embodiment of the fine pattern transferring apparatus.

FIG. 15 shows still another embodiment of the fine pattern transferring apparatus.

Unlike the main roll 10 according to the foregoing embodiment, the main roll 10 according to the present embodiment rotates in the clockwise direction. The touch rolls 221, 222 are provided corresponding to two rolling rubber rolls 70 whose rotational phase positions are different from each other by 90 degrees with respect to the center axis on which the sheet film forming roll 10 rotates.

The sheet film W is guided by a guide roll 235, and is thus sent to the roll surface of the main roll 10. Thereafter, the sheet film W is sent in such a way as to be wound around a part of the roll surface of the sheet film forming roll 10. A part of the place at which the touch roll 221 is disposed is a transfer starting position. This transfer starting position is located at a boundary between the first heating medium chamber 91 and the fourth heating medium chamber 94. A part of the place at which the touch roll 222 is disposed is a separation position at which the thermoplastic resin is separated from the main roll 10. This separation position is located at a boundary between the fourth heating medium chamber 94 and the third heating medium chamber 93.

With regard to the temperature management of the main roll 10 according to this embodiment, the temperature of the heating medium supplied to the heating medium supplying chamber 105 is set the highest in the first heating medium chamber 91 among the first to fourth heating medium chambers 91 to 94. The temperature of the heating medium supplied to the heating medium supplying chamber 105 is set in such a way as to become gradually lower toward the fourth heating medium chamber 94 and the third heating medium chamber 93. The temperature of the heating medium supplied to the heating medium supplying chamber 105 in the second heating medium chamber 92 is set slightly higher than the temperature of the heating medium supplied to the heating medium supplying chamber 105 in the third heating medium chamber 93. In addition, the surface temperature of the touch roll 221 is controlled in order to be almost equal to the surface temperature of the external cylinder 40 in the temperature controlling zone of the fourth heating medium chamber 94. The surface temperature of the touch roll 222 is controlled in order to be almost equal to the surface temperature of the external cylinder 40 in the temperature controlling zone of the third heating medium chamber 93.

This embodiment brings about the same operation and effect as the embodiment shown in FIG. 12 brings about.

Figure 16:
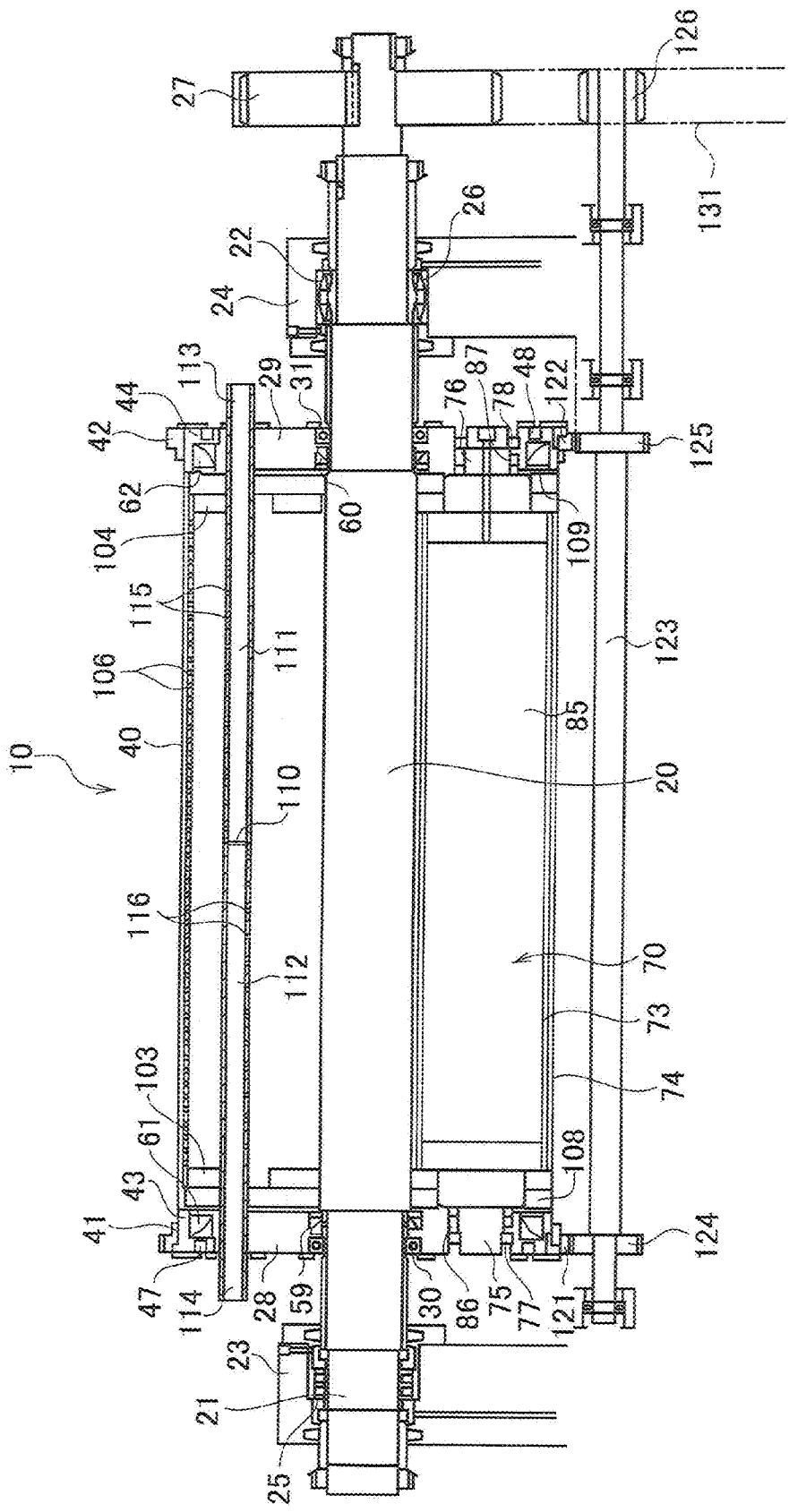
FIG. 16 is a longitudinal cross-sectional view showing a different embodiment of the main roll according to the present invention.
Figure 17:
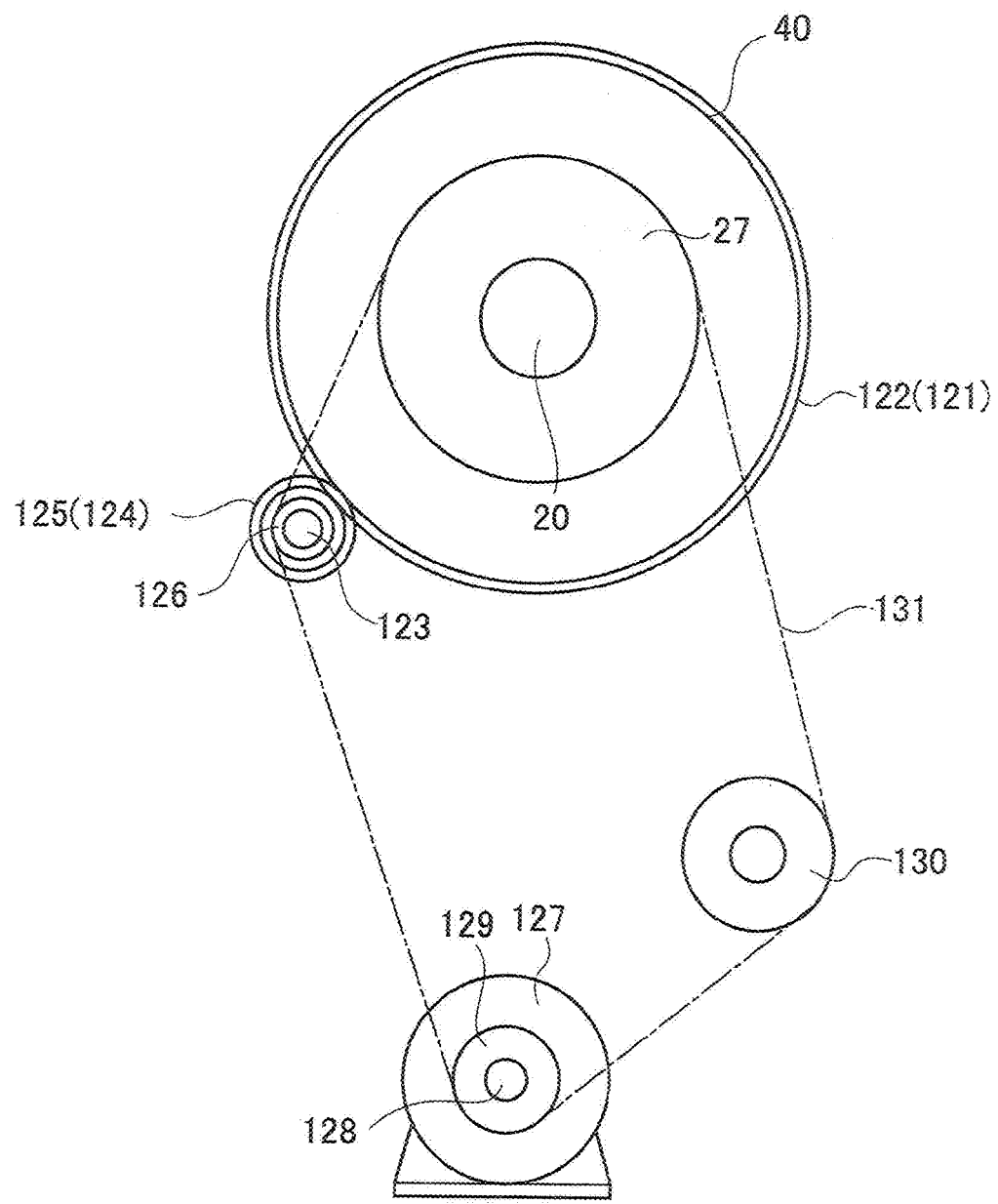
FIG. 17 is an explanatory diagram of a rotational driving system for the main roll according to the different embodiment.

Referring to FIGS. 16 and 17, descriptions will be provided for another embodiment of the main roll according to the present invention. In FIGS. 16 and 17, parts corresponding to those shown in FIGS. 2 to 4 will be denoted by the same reference numerals as those used in FIGS. 2 to 4 are denoted. In addition, duplicated descriptions for the corresponding parts will be omitted.

In this embodiment, the external cylinder 40 is forcedly rotationally driven in addition to the center rotary shaft 20 being rotationally driven. As external-cylinder rotationally-driving members, external gears 121, 122 are formed in the retainer band members 41, 42 located in the left and right ends (the two axial end portions) of the external cylinder 40, respectively. A gear shaft 123 is rotatably provided outside the external cylinder 40 in such a way as to be in parallel with the center rotary shaft 20. Driving gears 124, 125 configured to mesh with the respective external gears 121, 122 are fixedly attached to the gear shaft 123.

A timing pulley 126 is attached to the gear shaft 123. An endless timing belt 131 is hooked among the timing pulleys 126, 27, 130 and the timing pulley 129 attached to an output shaft 128 of an electric motor 127.

By this, the external cylinder 40 is rotationally driven in synchronism with the rotation of the center rotary shaft 20. Because the external cylinder 40 according to this embodiment is rotationally driven in this manner, the rotation of the external cylinder 40 according to this embodiment is more stable than the rotation of the external cylinder 40 according to the foregoing embodiment. Furthermore, the external cylinder 40 is not twisted, even if the length of the external cylinder 40 in the axial direction is long. That is because the external cylinder 40 is rotationally driven as a result of causing the external gears 121, 122 to rotationally drive the retainer band members 41, 42 located in the left and right ends of the external cylinder 40, or as a result of the left and right ends of the external cylinder 40 being rotationally driven.

In the above-described embodiments, the four rolling rubber rolls 70 are disposed in the inside of the external cylinder 40, and the inside of the external cylinder 40 is divided into the four chambers. In addition, the four temperature controlling zones are set in the respective four chambers. Nevertheless, as described above (see FIG. 7), the number of temperature controlling zones is not limited to the four. A necessary minimum number of temperature controlling zones may be set. In other words, the number of temperature controlling zones may be 2, 3, 5 or more.

The present invention is not limited to the scope which has been described, or the scope which has been described with regard to the foregoing embodiments of the present invention. The present invention can be carried out as other various modes by modifying the present invention depending on the necessity.

All the contents of Japanese Patent Application No. 2008-139686 (filed on May 28, 2008) are incorporated herein by its reference.

What is claimed is:

1. A touch roll, comprising:
a center rotary shaft rotatably supported by bearing members;
fixed end plates concentrically disposed respectively in two places which are away from each other in an axial direction of the center rotary shaft;
an external cylinder made of a metal film, and rotatably supported, at two ends thereof, by the respective fixed end plates, the external cylinder being concentric with the center rotary shaft; and
a plurality of rolling rubber rolls each rotatably supported, at two ends thereof, by the respective fixed end plates, the rolling rubber rolls being in sliding contact with an outer peripheral surface of the center rotary shaft, and being in sliding contact with an inner peripheral surface of the external cylinder, wherein
the rolling rubber rolls divide an annular space between the external cylinder and the center rotary shaft into a plurality of heating medium chambers arranged in a circumferential direction of the touch roll, and
the rolling rubber rolls are configured in a way that each of the plurality of heating medium chambers is filled with a heating medium.

2. The touch roll according to claim 1, wherein at least one of the rolling rubber rolls is different from the others of the rolling rubber rolls in terms of the amount of crowning.

3. The touch roll according to claim 2, further comprising:
an index positioning unit capable of positioning the fixed end plates at index positions.

4. A main roll, comprising:
a center rotary shaft rotatably supported by bearing members;
fixed end plates concentrically disposed respectively in two places which are away from each other in an axial direction of the center rotary shaft;
an external cylinder made of a metal film, and rotatably supported, at two ends thereof, by the respective fixed end plates, the external cylinder being concentric with the center rotary shaft; and
a plurality of rolling rubber rolls each rotatably supported, at two ends thereof, by the respective fixed end plates, the rolling rubber rolls being in sliding contact with an outer peripheral surface of the center rotary shaft, and being in sliding contact with an inner peripheral surface of the external cylinder, wherein
the rolling rubber rolls divide an annular space between the external cylinder and the center rotary shaft into a plurality of heating medium chambers arranged in a circumferential direction of the main roll,
the rolling rubber rolls are configured in a way that each of the plurality of heating medium chambers is filled with a heating medium, and
at least one of the rolling rubber rolls is different from the others of the rolling rubber rolls in terms of the amount of crowning.

5. The main roll according, to claim 4, further comprising:
an index positioning unit capable of positioning the fixed end plates at index positions.

6. A main roll, comprising:
a center rotary shaft rotatably supported by bearing members;
fixed end plates concentrically disposed respectively in two places which are away from each other in an axial direction of the center rotary shaft;
an external cylinder made of a metal film, and rotatably supported, at two ends thereof, by the respective fixed end plates, the external cylinder being concentric with the center rotary shaft;
a plurality of rolling rubber rolls each rotatably supported, at two ends thereof, by the respective fixed end plates, the plurality of rolling rubber rolls being in sliding contact with an outer peripheral surface of the center rotary shaft, and being in sliding contact with an inner peripheral surface of the external cylinder; and
an index positioning unit capable of positioning the fixed end plates at index positions, wherein
the rolling rubber rolls divide an annular space between the external cylinder and the center rotary shaft into a plurality of heating medium chambers arranged in a circumferential direction of the main roll, and
the rolling rubber rolls are configured in a way that each of the plurality of heating medium chambers is filled with a heating medium.

7. A sheet film casting apparatus, comprising the touch roll according to claim 3.

8. A sheet film casting apparatus, comprising the main roll according to claim 5.

9. A fine pattern transferring apparatus, comprising the touch roll according to claim 3.

10. A fine pattern transferring apparatus, comprising the main roll according to claim 5.

* * * * *